US010296988B2

(12) United States Patent
Mitra

(10) Patent No.: US 10,296,988 B2
(45) Date of Patent: May 21, 2019

(54) LINEAR OPTIMAL POWER FLOW SYSTEM AND METHOD

(71) Applicant: Board of Trustees of Michigan State University, East Lansing, MI (US)

(72) Inventor: Joydeep Mitra, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 859 days.

(21) Appl. No.: 14/458,597

(22) Filed: Aug. 13, 2014

(65) Prior Publication Data

US 2015/0051744 A1 Feb. 19, 2015

Related U.S. Application Data

(60) Provisional application No. 61/867,447, filed on Aug. 19, 2013.

(51) Int. Cl.
*G06N 5/00* (2006.01)
*G06Q 50/06* (2012.01)

(52) U.S. Cl.
CPC .............. *G06Q 50/06* (2013.01); *G06N 5/00* (2013.01); *Y02E 40/76* (2013.01); *Y04S 10/545* (2013.01)

(58) Field of Classification Search
CPC ......... G06Q 50/06; Y02E 40/70; Y02E 40/76; Y04S 10/00; Y04S 10/16; Y04S 10/545; G05N 5/003; G05N 5/006; G05N 5/00
USPC ................................... 700/286–298; 706/19
See application file for complete search history.

(56) References Cited

U.S. PATENT DOCUMENTS

| 5,483,462 A | 1/1996 | Chiang | |
| 6,745,109 B2* | 6/2004 | Kojima | G06Q 50/06 700/28 |
| 7,180,443 B1 | 2/2007 | Mookerjee et al. | |
| 8,055,358 B2* | 11/2011 | Blevins | G05B 13/022 700/28 |
| 8,055,598 B1* | 11/2011 | Freeman | G06F 3/0481 706/45 |

(Continued)

OTHER PUBLICATIONS

Garcia, A.V., et al., "Three-Phase Fast Decoupled Power Flow for Distribution Networks", IEE Proceedings—Generation, Transmission and Distribution, vol. 143, Issue 2 [online], Mar. 1996 [retrieved Apr. 29, 2017], Retrieved From Internet: <URL: http://ieeexplore.ieee.org/abstract/document/488155/>, pp. 188-192.*

(Continued)

*Primary Examiner* — Todd Aguilera
(74) *Attorney, Agent, or Firm* — Harness, Dickey & Pierce, PLC

(57) ABSTRACT

An electric power system or power grid is optimized using a computer-implemented tool the represents in computer memory the optimization function and at least one constraint, which the processor operates upon using a linear programming solver algorithm. The constraints are represented in memory as data structures that include both real and reactive power terms, corresponding to at least one of a power flow model and a transmission line model. The transmission line model is represented using a piecewise linear representation. The power flow model may also include for each node in the power system a real power loss term representing transmission line loss allocated to that node.

35 Claims, 12 Drawing Sheets

(56) References Cited

U.S. PATENT DOCUMENTS

| | | | | |
|---|---|---|---|---|
| 9,335,748 | B2* | 5/2016 | Francino | G05B 15/02 |
| 2004/0039490 | A1* | 2/2004 | Kojima | G06Q 50/06 |
| | | | | 700/287 |
| 2006/0111860 | A1 | 5/2006 | Trias | |
| 2006/0190227 | A1 | 8/2006 | Chiang et al. | |
| 2007/0168057 | A1* | 7/2007 | Blevins | G05B 13/022 |
| | | | | 700/53 |
| 2008/0103630 | A1 | 5/2008 | Eckroad | |
| 2012/0010757 | A1* | 1/2012 | Francino | G05B 15/02 |
| | | | | 700/291 |
| 2014/0032138 | A1 | 1/2014 | Shrestha et al. | |
| 2015/0088439 | A1* | 3/2015 | Coffrin | H02J 3/00 |
| | | | | 702/60 |

OTHER PUBLICATIONS

O'Neill, R.P., et al., "The IV Formulation and Linear Approximations of the AC Optimal Power Flow Problem", Federal Energy Regulator Commission [online], 2012 [retrieved Apr. 30, 2017], Retrieved from Internet: <URL: https://www.ferc.gov/industries/electric/indus-act/market-planning/opf-papers/acopf-2-iv-linearization.pdf>, pp. 1-18.*

Anonymous, "Data Structure Definition", The Linux Information Project [online], 2006 [retrieved Apr. 27, 2017], Retrieved from Internet: <URL: http://www.linfo.org/data_structure.html>, pp. 1-2.*

Mustafa, M.W., et al., "Real Power Loss Allocation Using Modified Nodal Equations for Deregulated Power System", Preoceedings of the 19th Australasian Universities Power Engineering Conference [online], 2009 [retrieved Apr. 30, 2017], Retrieved from Internet: <URL: http://ieeexplore.ieee.org/document/5356593/#full-text-section>, pp. 1-6.*

Ghai, R., et al., Data structure—What is a matrix?, CareerRide [online], 2010 [retrieved Jan. 2, 2018], Retrieved from Internet: <URL:https://web.archive.org/web/20120402184904/http://www.careerride.com/Data-structure-matrix-and-its-uses.aspx>, pp. 1-2.*

Elsaiah, S., et al., Analytical approach for placement and sizing of distributed generation on distribution systems, IET Generation, Transmission & Distribution [online], vol. 8, Iss. 6, Jun. 9, 2014 [retrieved Jan. 7, 2019], Retrieved from Internet: <URL: https://ieeexplore.ieee.org/document/6826880>, pp. 1039-1049.*

Hsiao-Dong Chiang: "Numerical Network-Preserving BCU Method," Direct Methods for Stability Analysis of Electric Power Systems, 2011, pp. 300-325.

Mohammed Benidris et al.: "A Fast Transient Stability Screening and Ranking Tool," Power Systems Computation Conference (PSCC), 2014, Aug. 2014, pp. 1, 7, 18-22.

Hsiao-Dong Chiang et al.: "Stability Regions of Nonlinear Autonomous Dynamical Systems," IEEE Transactions on Automatic Control, vol. 33, No. 1, Jan. 1988, pp. 16-27.

Zhenyi Ji et al.: "Constructing the Lyapunov Function through Sovling Positive Dimensional Polynomial System," Journal of Applied Mathematics, vol. 2013, Nov. 2013, 5 pgs., 2013, doi:1031155/2013/859578.

F. Wesley Wilson, Jr: "The Structure of the Level Surfaces of a Lyapunov Function," Journal of Differential Equations, vol. 3, 1967, pp. 323-329.

Alex Borisevich et al.: "Switching Strategy Based on Homotopy Continuation for Non-Regular Athne Systems with Application in Induction Motor Control," CoRR, abs/1203.5919.

Eric Hanson: "On Using Numerical Algebraic Geomery to Find Lyapunov Functions of Polynomial Dynamical Systems," Dynamics at the Horsetooth, vol. 2, 2010, 5 pgs.

Hsiao-Dong Chiang: "Foundations of Direct Methods for Power System Transient Stability Analysis," IEEE Transactions on Circuits and Systems, vol. CAS-34, No. 2, Feb. 1987, pp. 160-173.

Licheng Jin et al.: "An Application of Reachable Set Analysis in Power System Transient Stability Assessment," Power Engineering Society General Meeting, 2005. IEEE, pp. 1715, 1719, vol. 2, pp. 12-16 Jun. 2005.

North American Electric Reliability Council: "Technical Analysis of the Aug. 14, 2003, Blackout: What Happened, Why and What Did We Learn?" Report to the NERC Board of Trustees by the NERC Steering Group, Jul. 13, 2004.

* cited by examiner

LINEAR OPTIMAL POWER FLOW SYSTEM AND METHOD

CROSS-REFERENCE TO RELATED APPLICATIONS

This application claims the benefit of U.S. Provisional Application No. 61/867,447 filed on Aug. 19, 2013. The entire disclosure of the above application is incorporated herein by reference.

GOVERNMENT LICENSE RIGHTS

This invention was made with Government support under AR0000222 awarded by the Department of Energy Advanced Research Projects Agency—Energy. The Government has certain rights in the invention.

FIELD

The present disclosure relates generally to network optimization and more particularly to optimization of the electric power grid using computer-implemented systems and methods.

BACKGROUND

This section provides background information related to the present disclosure which is not necessarily prior art.

In 1889 when the first electric power transmission line in North America came online, it formed a 4,000 volt connection between the generating station at Willamette Falls in Oregon City, Oreg. and the generating station at Chapman Square in downtown Portland Oreg., some fourteen miles away. In those simple times the notion of a power grid was far from concern. Today, however the situation is quite different. Even ignoring the thousands of small wind powered and solar powered generators, the power grid in North America encompasses approximately 18,000 generators with a combined capacity of over 1.1 TeraWatts. Connecting this network is over 160,000 miles of overhead lines that supply distribution systems that have many more thousands of miles of feeder lines.

To this power grid are attached millions of different loads, ranging from lighting circuits, to heavy induction motors, to telecommunications systems, and to servers that power the Internet cloud. Each of these different loads has unique characteristics. Lighting loads tend to be mostly resistive in nature; inductive loads, such as inductive motors, tend to have a large reactive component in addition to a resistive component. As power engineers will tell you, resistive loads and reactive loads behave quite differently, particularly when system dynamics are considered. When an inductive motor is switched on its coils have a very low inductance, so they act as very low value resistors. This means that you get a surge of current when a motor is first switched on. This can cause a voltage spike on the supply as the supply tries to cope with the high current being drawn. Thus daily usage of the power grid by millions and millions of users inevitably causes surges, brownouts and other dynamic effects that can lead to instability of not carefully monitored.

In addition to usage-based instabilities, the power grid is also exposed to nature, and that introduces another huge source of instability. Lightning strikes, wind and ice storms as well as other natural disasters break power lines, burn out transformers and generators, all which cause power failures. When these failures occur, a portion of the grid being fed by the affected systems may attempt to draw power from other portions of the grid, and this produces other transient surges in the remaining lines as the grid attempts to compensate.

Adding to the effects of daily usage and natural disasters, the power grid is also subject to intentional load shedding, whereby the power utility company will intentionally take certain loads offline, under contractual agreement, to balance loads or to shift loads to a time when demand is lower. By performing load shedding, the power utility company saves cost. This is because the generators used to handle peak demands tend to be powered by more costly fuel sources, such as diesel fuel.

Adding still further to the complexity of the power grid, alternating electric current (AC) is typically generated as three-phase AC current. Doing so allows transmission of the total power with half as much wire. However, it does require three separate phases to be generated and carried by three separate transmission lines. To operate a three-phase system efficiently, the amount of power flowing on each phase should be kept balanced or equal as much as possible. However, because many loads may be connected to only one phase, such as in the typical residence for example, there is no way to guarantee that all phases will be balanced, unless a power engineer monitors the loads and compensates when the loads become too far out of balance.

From the foregoing it should be appreciated that the power grid today is a very complex and dynamic system. Power utility companies today employ computer-implemented software systems that can perform rudimentary monitoring of the health of the power grid. However, due to the complexity of the grid itself, these existing monitoring systems make simplifying assumptions about how to model the power grid. These simplifying assumptions are needed to allow the computer to make predictions about the stability and health of the power grid at a quick enough response rate to be useful to the power engineer.

SUMMARY

This section provides a general summary of the disclosure, and is not a comprehensive disclosure of its full scope or all of its features.

Disclosed is computer-implemented tool, method and system for optimizing a power system. The tool employs a processor having associated memory storing executable code with which the processor is programmed to execute a solver algorithm. The memory is configured to store an optimization function upon which the processor operates in executing the solver algorithm. More specifically, the memory is configured to store at least one constraint accessed by the processor in executing the solver algorithm, where the constraint is stored in memory according at least one of the following data structures:

a. a power flow model data structure that includes both real and reactive power terms; and
  b. a transmission line model data structure that includes both real and reactive power terms.

The processor is programmed to generate and represent the constraint(s) as a set of piecewise linear constraints which are calculated according to a predefined framework. The processor operates upon input real-world values (e.g., a real as opposed to reactive value) treating these as seed values that the processor then uses to generate a set of plural parameterized piecewise linear constraints for each seed value.

The computer-implemented tool and method thus casts the power grid optimization problem in terms of both real and reactive components, which it linearizes by generating piecewise linear constraints, thereby allowing a linear programming solver to operate upon an optimization function within these linearized constraints.

BRIEF DESCRIPTION OF THE DRAWINGS

The drawings described herein are for illustrative purposes only of selected embodiments and not all possible implementations, and are not intended to limit the scope of the present disclosure.

DESCRIPTION OF PREFERRED EMBODIMENTS

Example embodiments will now be described more fully with reference to the accompanying drawings. Specifically, in the following detailed description a first linear optimal power flow system embodiment is presented, including an explanation and derivation of several underlying models. Thereafter a second, enhanced linear optimal power flow embodiment is presented, including an explanation and derivation of its underlying models. These two embodiments are exemplary. Other variations are possible.

Introduction

Figure 1:
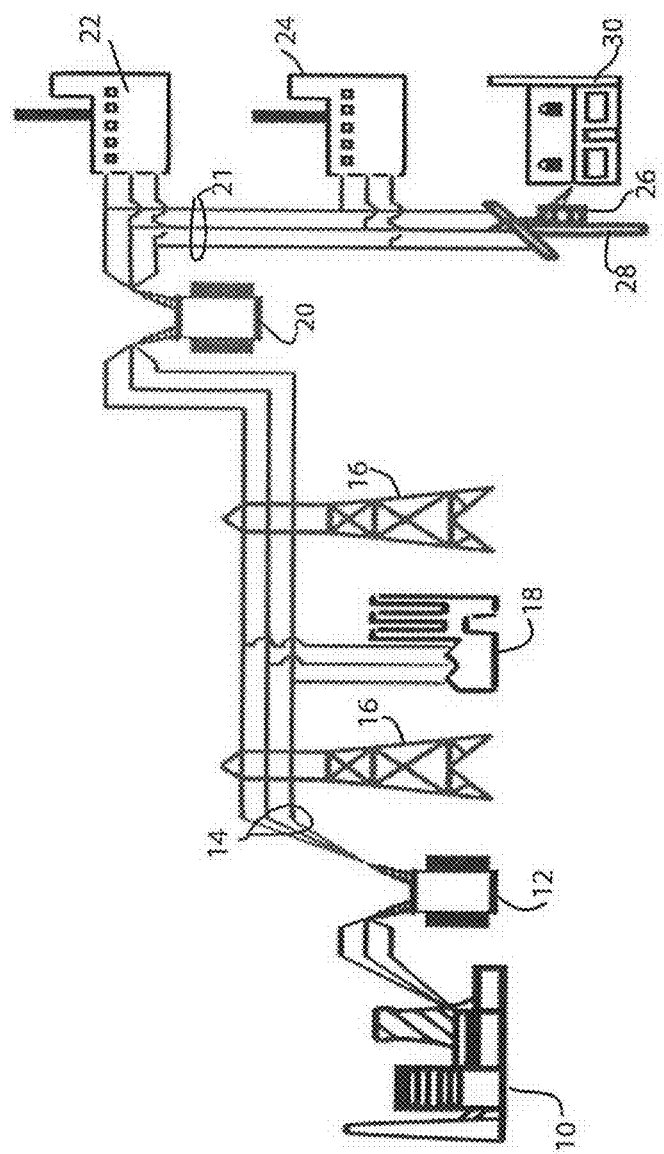
FIG. 1 is a schematic diagram showing the functional parts of a power system.

The disclosed linear optimal power flow system may be used to optimize any of a variety of different aspects of an electric power system. Thus a basic understanding of such electric power system will be helpful. Shown in FIG. 1 are the functional parts of an exemplary electric power system. The generating station 10 produces three-phase alternating current (AC) power that is stepped up in voltage by the three-phase generating step up transformer 12. Step up transformer 12 supplies power at its step up voltage to a set of three-phase transmission lines 14 that are typically carried by towers 16. The step up voltage is typically dictated by the power system engineers who designed the system. Typical transmission line voltages are 765 kV, 500 kV, 345 kV, 230 kV and 138 kV. High voltages are used because high voltages transfer power at lower currents, and lower currents produce lower transmission losses for a given transmission line resistance.

Some customers, called transmission customers 18, are equipped to use these high voltage transmissions directly. Thus customers 18 tap directly into the high voltage transmission lines 14, as illustrated. Not shown, these customers will have their own step down transformers in order to use the supplied power at lower voltages. For other customers which do not have such step down transformer equipment, the electric power system includes one or more three-phase substation step down transformers 20. These step down the voltage to a lower level, such as 69 kV or 26 kV or to supply subtransmission customers 22, and such as 13 kV and 4 kV to supply primary customers 24. These subtransmission customers 22 and primary customers 24 are also likely to have their own step down transformer equipment to reduce the voltage to even lower levels as their uses may require.

The secondary side of substation step down transformer 20 is coupled to other transmission lines 21, which carry stepped down voltages (e.g., 4 kV) to a plurality of distribution transformers 26. These distribution transformers are typically mounted on pads or more commonly on poles 28. The distribution transformers 26 supply secondary customers with power typically at 120V and 240V. For residential applications, the distribution transformers are typically single-phase; they are coupled to only one of the three-phase transmission lines 21. This is because most residential customers do not require three-phase power and thus the residential load may be economically distributed across all three phases to reduce the amount of transmission line required to serve the market.

Figure 2:
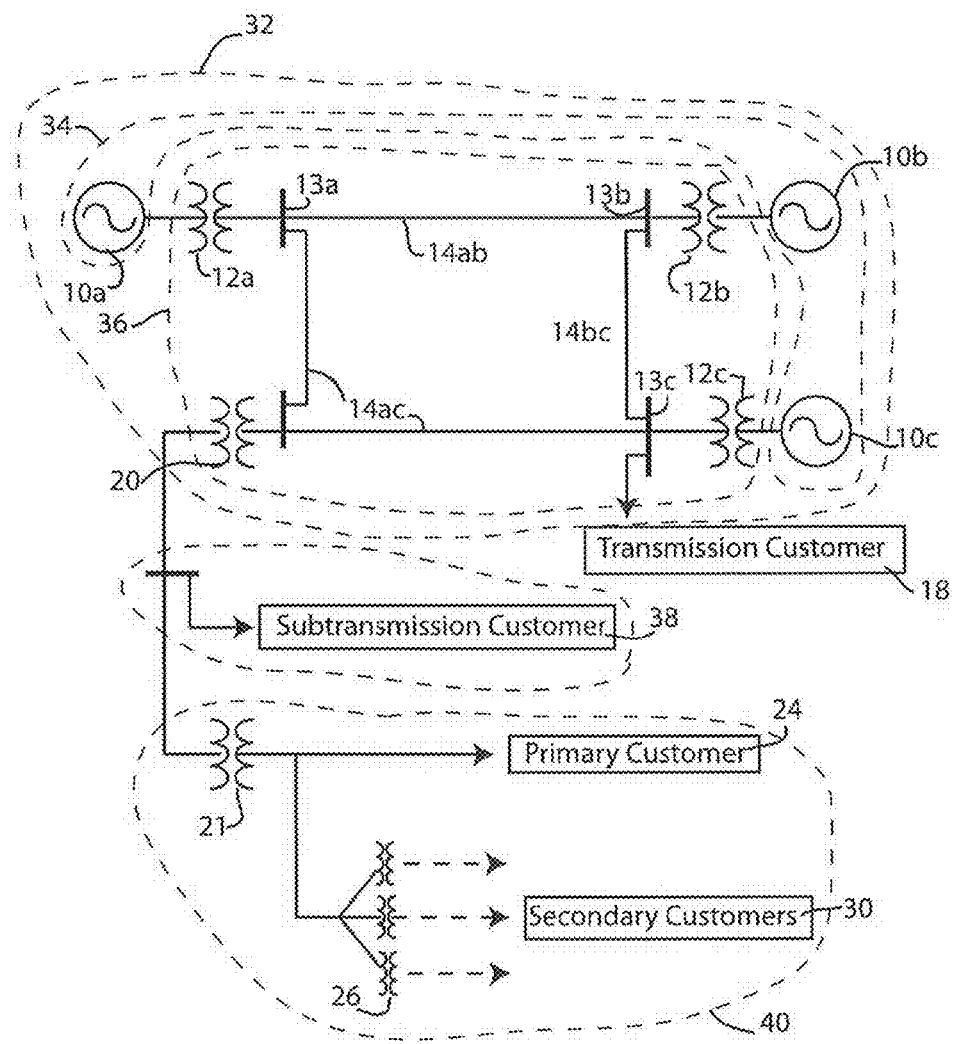
FIG. 2 is a schematic diagram showing an exemplary portion of a power grid.

The basic components that make up an electric power system are interconnected to define an electric power grid. The way this is normally done is illustrated in FIG. 2. For illustration purposes, three generating stations 10a, 10b and 10c have been illustrated. Each generating station has an associated generating step up transformer 12a, 12b and 12c. The secondary side of each of these transformers defines a bus (13a, 13b, 13c) that can be connected to a transmission customer 18, as illustrated at bus 13c. The grid is defined by interconnecting these busses together, via transmission lines 14ab, 14bc and 14ac.

From a high-level perspective the electric power system defined by these interconnections defines a three-phase bulk power system 32 which comprises a collective three-phase generation system 34 and a three-phase transmission system 36. The three-phase transmission system is also referred to as the grid.

As shown, substation step down transformer 20 directly supplies the subtransmission customer 22, while a further step down transformer 21 (not specifically shown in FIG. 1) supplies primary customers 24 and supplies the distribution transformers 26 which, in turn, supply the secondary customers 30. From a high-level perspective the portion of the electric power system that supplies the subtransmission customers is referred to as the subtransmission system 38. The portion that supplies the primary and secondary customers is referred to as the distribution system 40.

Figure 3:
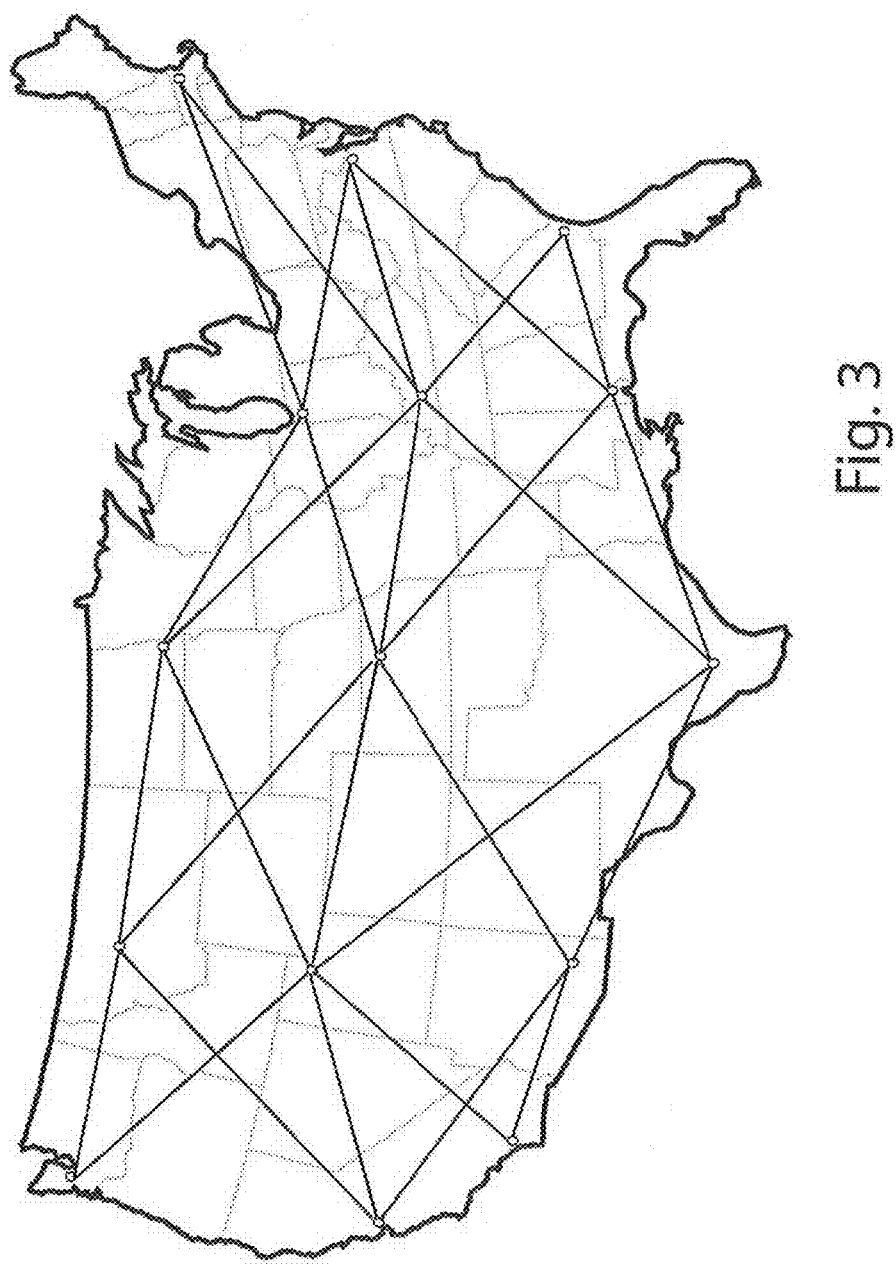
FIG. 3 is a schematic diagram showing a high-level view of a power grid

While FIG. 2 shows only three generating stations in the generation system, in practice the arrangement is far more complex. Through an intricate interconnection of transmission lines, generating stations throughout a vast geographical expanse, such as the United States and Canada, are networked together by the grid. Although not to scale, this has been illustrated diagrammatically in FIG. 3. From a network standpoint, each of the depicted nodes or busses are connected together, or capable of being connected together as dictated by power demand. Thus power flows into and out from these nodes as dictated by the loads at the different customers. It should be borne in mind that only nodes at the same nominal voltage are connected together by the grid. Thus the illustration in FIG. 3 is somewhat simplified, as it shows only nodes that are connected or capable of being connected by transmission line coupling. In actual practice a more precise illustration would have multiple different networks, at different voltage levels, all overlaid on the same geographical region. In practice, the highest voltage transmission lines are typically used to interconnect sections of the generation system that are distant from one another. Lower voltage transmission lines are typically found in older portions of the grid where it is not cost effective to upgrade to more efficient higher voltages.

The electric power system is a dynamic system. Power flow among nodes changes from minute to minute. Engineers who manage the electric power system have controls allowing them to fine tune power flow across the grid, with a typical goal being to optimize the system for keep operating costs as low as possible while meeting the needs of all of the system's customers. Conventional tools for doing this are comparatively crude, as many simplifying assumptions are made to render the computations manageable. The linear optimal power flow system disclosed here offers a significant improvement over conventional tools in at least two important respects. First the disclosed linear optimal power flow system is able to model both the real and the reactive power flow components. Conventional tools disregard the reactive power flow component altogether. Second, the disclosed linear optimal power flow system is able to model both real and reactive components of each transmission line. In this regard, two options are made available. In one embodiment, the transmission line model assumes the transmission line is lossless. In another embodiment, the transmission line model accounts for power losses within the transmission line. In both such embodiments both real and reactive components are considered.

Figure 4:
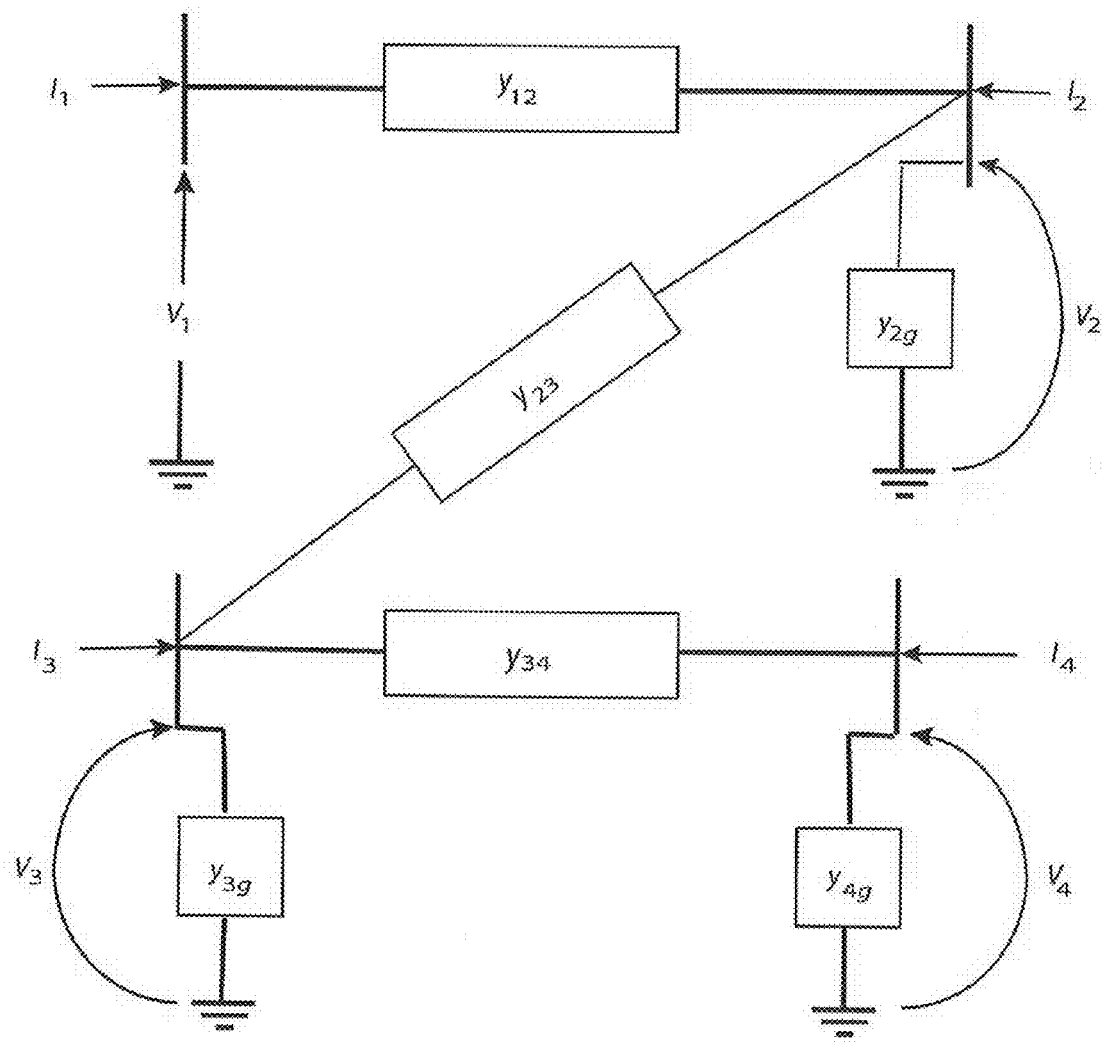
FIG. 4 is a schematic diagram of a four-bus AC network

To provide a basic framework useful in discussing the techniques employed by the linear optimal power flow system, FIG. 4 shows an exemplary four-bus network (four nodes). Current flow into each node (positive current flow) or current flow out from each node (negative current flow) is depicted by the letter I. The voltage, measured with respect to ground, at each node is depicted by the letter V. Power is the product of current and voltage at each node. Because both current and voltage are time-varying at the generation frequency (e.g., 60 Hz), current and voltage may not necessarily be in phase. Thus the power flowing into or out of any given node may have both a real and a reactive component. As used herein, the letter P designates the real power component and Q designates the reactive power component. Real power is associated with resistive loads, such as incandescent lights, heating elements and the like. Reactive power is associated with reactive loads, such as motors, inductors, capacitors, and the like.

The disclosed linear optimal power flow system provides a tool whereby power system engineers may optimize the power grid by solving an optimal power flow problem, using the specific power flow models and transmission line models described. The tool is preferably implemented by computer, programmed as described herein, to compute solutions to optimal power flow problems input by the power system engineer. Thus the linear optimal power flow system provides the engineer with a tool that is far more accurate than conventional tools, without significantly increasing the computation time as compared with conventional tools.

The linear optimal power flow system can be used for a variety of power grid and power flow optimization problems. For illustration purposes, the optimal power flow (OPF) problem will be used to show how the improved power flow models and transmission line models are used.

The Optimal Power Flow Problem

The optimal power flow (OPF) problem, which dates back to the 1960s, covers a group of network related optimization problems in the field of power system planning, operation or control. Examples of these problems can be: minimization of transmission loss, maximization of market profit, minimization of number of altered control variables, minimization of transmission line congestion, or minimization of pollution emission and operation cost et al. Mathematically, it requires the solution of a static constrained nonlinear optimization problem with one or more objective functions and a set of equality and inequality constraints shown in equations (2)-(3). F (x, u) is the objective function; it can be generation cost, load curtailment or transmission line congestion. g(x, u) and h(x, u) are equality and inequality constraints for the network states and control variables. Its solution offers the optimal control variables that best satisfy objectives and respect prespecified constraints. Numerical methods have been proposed to deal with OPF problem. Based on their intrinsic characteristics, they can be classified into two categories: linear programming (LP) based methods and non-linear programming (NLP) based methods.

Minimize: $F(x,u)$ (1)

Subject to: $g(x,u)=0$ (2)

$h(x,u) \le 0$ (3)

Linear programming-based methods are credited for their fast and reliable attributes, however, the requirement for linearized model and accuracy consideration sometimes restrict their applications. A most common linear programming-based method is solving OPF problem by DC power flow model. In this method, reactive power network equations are dropped, and all the voltage magnitudes are assumed to be 1.0 per unit in the network. This method is popularly adopted in many commercial software because of its speed and reliability. It can be used to calculate megawatt flows on transmission lines, but it does not indicate any information about voltage magnitudes or MVar flows. Another common linear programming-based method is to solve full power flow model at operating point and then linearize OPF problem at that point. This method, often called the LP-OPF method, is considered one of the most reliable non-linear optimization methods applied to power flow optimization. However, it works when optimal point is near operating point and it requires pre-acquisition of system operating point. Many practical systems do not have this information. In performing the linear programming-based method, many systems use a successive linear programming approach. This approach solves the non-linear network model by using repetitive linear programmings to approach the optimal solution. However, it requires high computational capability.

Non-linear programming (NLP)-based methods are often favored for high accuracy, but this benefit is achieved by sacrificing computational time and consuming vast amounts of computer memory. Most prevailing NLP-based methods existed to address OPF problem include descent methods, Newton's methods, sequential quadratic programming, gradient projection methods, augmented Lagrangian methods, interior point methods, heuristic methods, and others. However, each of these methods is only superior to others for a certain format of nonlinear optimal problems. No single method is expert in solving all kinds of optimization problems.

The Linear Optimal Power Flow System

To overcome the deficiencies with conventional techniques, the linear optimal power flow system employs a specialized, generic framework for linearized optimal power flow. To give a better understanding of the linearized optimal power flow framework, this disclosure will begin by deriving linearized power flow equations upon which the computer-implemented tool is based. The equations define a linearized AC model. Like the DC model, this linearized AC model can be solved for network states in one iteration; therefore it has the speed and reliability advantages of the DC model. But unlike the DC model, this model can provide voltage magnitude and reactive power flow information for the network. Furthermore, the linearized optimal power flow AC model also produces far more accurate results than the DC model with substantially less computational work than required to perform a full AC power flow analysis.

After deriving the linearized power flow equations, this disclosure will then discuss how transmission line constraints are linearized. When performing conventional DC optimal power flow, only real power flow constraints are considered; reactive power is always neglected, which introduces errors that are far from negligible. To obtain more precise results, the linear optimal power flow system employs a piecewise linearization method for the complex power flow constraints. In the end, this disclosure will describe a linearization algorithm for transmission line losses. As those of skill in the art will appreciate, a full AC optimal power flow cannot be directly solved by linear programming. However, the linear optimal power flow system employs a linearization algorithm which linearizes the AC optimal power flow framework, making it possible for the system to acquire more accurate and complete network state information by linear programming in a fast and reliable manner.

Development of Linearized AC Power Flow Formulation (Lossless Model)

It is well known that the basic power flow equations for real and reactive power are presented as:

$$P_k = V_k \sum_{m \in S} V_m (G_{km} \cos\theta_{km} + B_{km} \sin\theta_{km}) \quad (4)$$

$$Q_k = V_k \sum_{m \in S} V_m (G_{km} \sin\theta_{km} - B_{km} \cos\theta_{km}) \quad (5)$$

where $P_k$ and $Q_k$ are real and reactive power injected into node k; $V_k$ and $V_m$ are voltage magnitude at node k and node m; S is the set of all the buses in the system. $\theta_{km}$ is the voltage angle difference between node k and node m; $G_{km}$ and $B_{km}$ are the real and reactive part of (k,m) element of bus admittance matrix ($Y_{km}$).

Next we will approximate the magnitude of the voltage at bus k by 1.0 p.u. However, it is important to note that this is only an approximation that enables the linearization; it is not an assumption that the voltage magnitude equals 1.0 p.u.

$$P_k \approx \sum_{m \in S} V_m (G_{km} \cos\theta_{km} + B_{km} \sin\theta_{km}) \quad (6)$$

$$Q_k \approx \sum_{m \in S} V_m (G_{km} \cos\theta_{km} - B_{km} \cos\theta_{km}) \quad (7)$$

If the phase angles between two adjacent buses are small enough, it is valid to make the approximation that sin $\theta_{km} = \theta_{km}$, cos $\theta_{km} = 1$. Then the equations above can be expressed as:

$$P_k \approx \sum_{m \in S} (V_m G_{km} + V_m B_{km} \theta_{km}) \quad (8)$$

$$Q_k \approx \sum_{m \in S} (V_m G_{km} \theta_{km} - V_m B_{km}) \quad (9)$$

If we let $V_m \approx 1.0$ p.u. (as before, this is only an approximation) for the second term of (8) and the first term of (9):

$$P_k \approx \sum_{m \in S} (V_m G_{km} + B_{km} \theta_{km}) \quad (10)$$

$$Q_k \approx \sum_{m \in S} (G_{km} \theta_{km} - V_m B_{km}) \quad (11)$$

Let us focus on (10) first, it can be further written as:

$$P_k \approx \sum_{m \in S} V_m G_{km} + \sum_{m \in S} B_{km} \theta_k - \sum_{m \in S} B_{km} \theta_m \quad (12)$$

$$\text{Since } B_{km} = \begin{cases} \sum_{n \neq k} b_{kn} + b_{kk} & \text{for } m = k \\ -b_{km} & \text{for } m \neq k \end{cases}$$

where $b_{kk}$ is the total shunt susceptance at bus k. $b_{km}$ is the susceptance of brance connecting node k and node m. Hence, $$\sum_{m \in S} B_{km}\theta_k = \left[-b_{k1} - \ldots + \left(\sum_{m \neq k} b_{km} + b_{kk} =\right) - \ldots - b_{kN}\right]\theta_k \quad (13)$$

$$= b_{kk}\theta_k$$

Finally, linearized real power equation can be obtained by rearranging equation (12):

$$P_k \approx \sum_{m \in S} V_m G_{km} - \sum_{m \neq k} B_{km}\theta_m - (B_{kk} - b_{kk})\theta_k \quad (14)$$

In the same manner, the linearized reactive power can be expressed as:

$$Q_k \approx -\sum_{m \neq k} G_{km}\theta_m - (G_{kk} - g_{kk})\theta_k - \sum_{m \in S} V_m B_{km} \quad (28)$$

Figure 5:
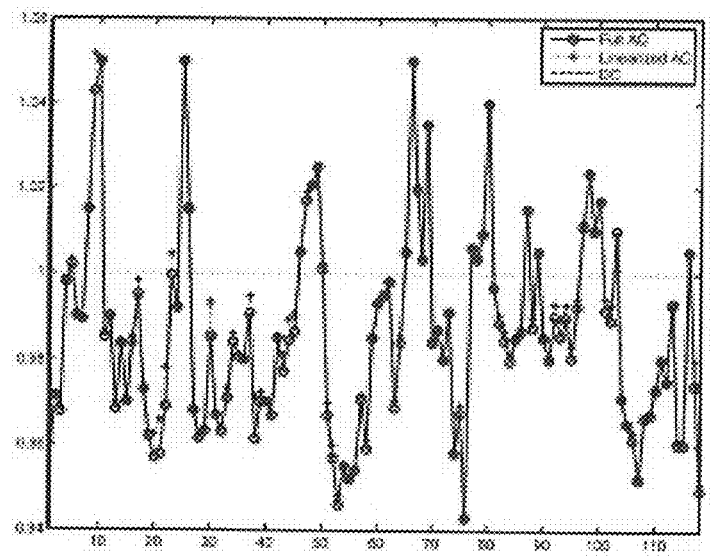
FIG. 5 is a graph depicting a voltage magnitude comparison among full AC power flow, linearized AC power flow and DC power flow.

In matrix form, the linearized AC power flow can be described as:

$$\begin{bmatrix} P \\ Q \end{bmatrix} \approx \begin{bmatrix} B_p & G_p \\ G_q & B_q \end{bmatrix} \begin{bmatrix} \theta \\ V \end{bmatrix} \quad (16)$$

where $B_p = \begin{bmatrix} -(B_{11} - b_{11}) & -B_{12} & \cdots & -B_{1N} \\ -B_{21} & -(B_{22} - b_{22}) & \cdots & -B_{2N} \\ \cdots & \cdots & \cdots & \cdots \\ -B_{N1} & -B_{N2} & \cdots & -(B_{NN} - b_{NN}) \end{bmatrix}$ $G_p = \begin{bmatrix} G_{11} & G_{12} & \cdots & G_{1N} \\ G_{21} & G_{22} & \cdots & G_{2N} \\ \cdots & \cdots & \cdots & \cdots \\ G_{N1} & G_{N2} & \cdots & G_{NN} \end{bmatrix}$ $G_q = \begin{bmatrix} -(G_{11} - g_{11}) & -G_{12} & \cdots & -G_{1N} \\ -G_{21} & -(G_{22} - g_{22}) & \cdots & -G_{2N} \\ \cdots & \cdots & \cdots & \cdots \\ -G_{N1} & -G_{N2} & \cdots & -(G_{NN} - g_{NN}) \end{bmatrix}$ $B_q = \begin{bmatrix} -B_{11} & -B_{12} & \cdots & -B_{1N} \\ -B_{21} & -B_{22} & \cdots & -B_{2N} \\ \cdots & \cdots & \cdots & \cdots \\ -B_{N1} & -B_{N2} & \cdots & -B_{NN} \end{bmatrix}$ From equation (16), it is shown that the proposed linearized AC power flow model can indicate voltage magnitude and reactive power information for the network. FIG. 5 displays voltage magnitudes for IEEE 118 test system obtained by full AC power flow, linearized AC power flow and DC power flow respectively. It clearly demonstrates that the proposed linearized AC power flow can obtain very accurate voltage magnitude results. Table 1 lists the maximum voltage magnitude errors and their corresponding bus numbers for IEEE 14, 30, 57 and 118 system. It is shown in the results that linearized AC power flow model has better voltage magnitude approximation than traditional DC power flow model. Maximum errors of voltage vectors and their corresponding bus numbers for those four IEEE test system are given in Table 2. The results also reveal the accuracy of the proposed linearized AC power flow.

Notice that the formulation developed in this section is a lossless power flow model. It can be proved simply by adding all the right part of power flow equations together, and it ends up to be zero.

TABLE 1

Maximum voltage magnitude errors for IEEE 14, 30, 57, 118 test system

| Method | | 14 bus | 30 bus | 57 bus | 118 bus |
|---|---|---|---|---|---|
| DC power flow | Bus No. | Bus 8 | Bus 11 | Bus 31 | Bus 76 |
| | Max error | 8.26% | 7.58% | 6.85% | 6.04% |
| Linearized AC power flow | Bus No. | Bus 5 | Bus 30 | Bus 31 | Bus 38 |
| | Max error | 0.53% | 0.76% | 2.24% | 1.01% |

Linearization of Transmission Line Constraint

In traditional DC optimal power flow calculation, reactive power flow is always not considered. Power flow constraints of transmission lines are simply assumed to be real power flow constraints, which can be stated as equation (17). This simplification will introduce non-negligible error in the optimal power flow calculation, since reactive power flow sometimes takes up a non-neglectable portion in the power flow of transmission line.

$$|P_{ij}| \leq |S_{ij}^{max}| \quad (17)$$

Figure 6:
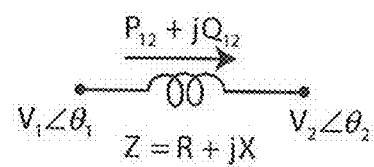
FIG. 6 is a schematic diagram of a two-node simple system, useful in understanding how the transmission line is modeled.
Figure 10:
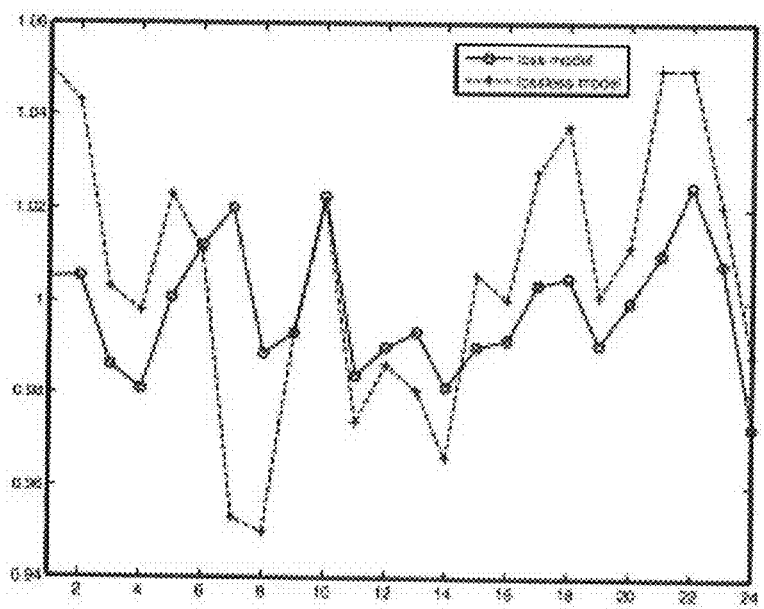
FIG. 10 is a graph comparing voltage magnitude for the linearized AC OPF loss and lossless models.

In the linearized optimal power flow proposed in this report, reactive power flow is linearized and considered. Consequently, a linearized transmission line constraint should be developed to incorporate reactive power. First consider a simple system shown in FIG. 6.

Power flow in this transmission line can be calculated as:

$$P_{12} = \frac{R}{Z^2}(V_1^2 - V_1 V_2 \cos\theta_{12}) + \frac{X}{Z^2} V_1 V_2 \sin\theta_{12} \quad (18)$$

$$Q_{12} = -V_1^2\left(\frac{B}{2} - \frac{X}{Z^2}\right) - V_1 V_2\left(\frac{X}{Z^2}\cos\theta_{12} + \frac{R}{Z^2}\sin\theta_{12}\right) \quad (19)$$

Assume that the difference between $\theta_1$ and $\theta_2$ is not significant, then we can make the approximation that $\sin\theta_{12} \approx \theta_{12}$, $\cos\theta_{12} \approx 1$. Considering in the transmission system, $R \ll X$. Therefore, it is acceptable to assume that $R \approx 0$,

TABLE 2

Maximum voltage vector errors for IEEE 14, 30, 57, 118 test system

| Method | | 14 bus | 30 bus | 57 bus | 118 bus |
|---|---|---|---|---|---|
| DC power flow | Bus No. | Bus 8 | Bus 11 | Bus 31 | Bus 10 |
| | Max error | 8.31% | 7.60% | 7.01% | 10.22% |
| Linearized AC power flow | Bus No. | Bus 14 | Bus 19 | Bus 31 | Bus 10 |
| | Max error | 1.89% | 1.41% | 2.48% | 8.92% |

$X \approx Z$. Further, assume that the system is operated near operating point, then we have $V_1 \approx 1.0$ p.u., $V_2 \approx 1.0$ p.u. Consequently, equations (18) and (19) can be simplified as:

$$P_{12} \approx \frac{\theta_1 - \theta_2}{Z} \quad (20)$$

-continued $$Q_{12} \approx -V_1 \frac{B}{2} + \frac{V_1 - V_2}{Z|} \quad (21)$$

Originally, expression of transmission line constraint is:

$$|S_{12}| \approx \sqrt{P_{12}^2 + Q_{12}^2} \leq |S_{12}^{max}| \quad (22)$$

Figure 7:
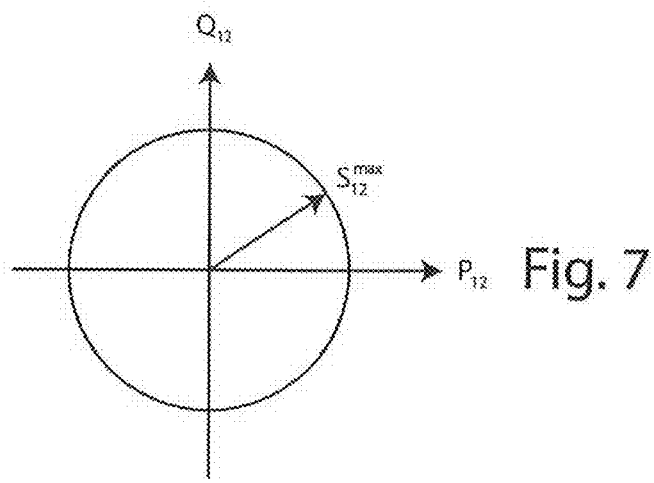
FIG. 7 is a transmission line constraint diagram.

Equation (22) indicates that eligible real and reactive power flow without violating transmission line constraint drop in a circle, whose radius is $S_{12}^{max}$. The circle shown in FIG. 7 depicts the boundary restricting real and reactive power flow. Obviously, the constraint is not linear.

Figure 8A:
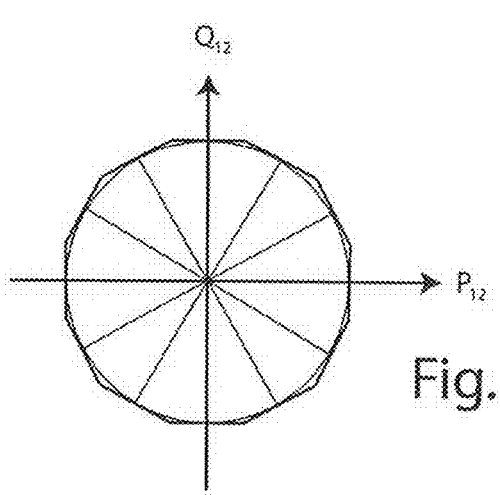
FIGS. 8a and 8b illustrate, respectively, a piecewise linear approximation of a circular boundary, and piecewise linear constraints for the transmission line

To linearize the constraint, a piecewise approximation of the boundary can be utilized. In FIG. 8a, a total number of twelve straight lines have been used to approach the circular boundary. In general, any number of lines, as deemed suitable by one applying this approach, may be used, bearing in mind that a larger number of lines improves accuracy but increases the number of constraints thereby increasing computation time. Moreover, in situations where it is known that the flow through a line is predominantly real, then it may be suitable to reduce the number of constraints.

Figure 8B:
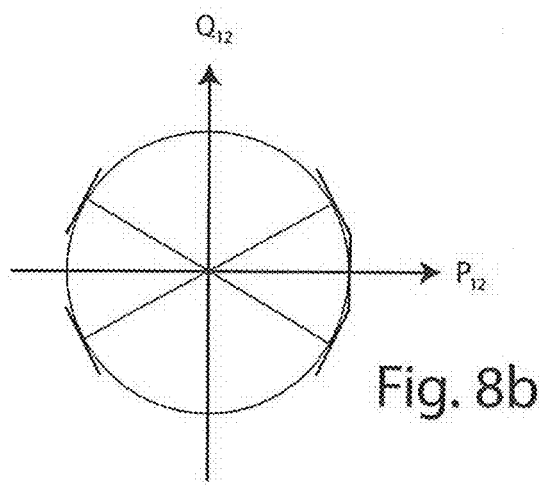

As an example, the number of linear constraints for a transmission line is reduced to six as shown in FIG. 8b if it is known that the other constraints are not likely to be violated. Notice that the two constraints perpendicular to P axis are the old constraints for traditional DC power flow, mathematically stated as:

$$-S_{12}^{max} \leq P_{12} \leq S_{12}^{max} \quad (23)$$

The other four constraints perpendicular to dismeters with angles 30° or −30° shown in FIG. 8b can be geometrically formulated as:

$$-1.15 S_{12}^{max} \leq P_{12} - 0.58 Q_{12} \leq 1.15 S_{12}^{max} \quad (24)$$

$$-1.15 S_{12}^{max} \leq P_{12} + 0.58 Q_{12} \leq 1.15 S_{12}^{max} \quad (25)$$

Equations (23)-(25) are integrated together to construct linear constraints of transmission lines for linearized optimal power flow.

Figure 9:
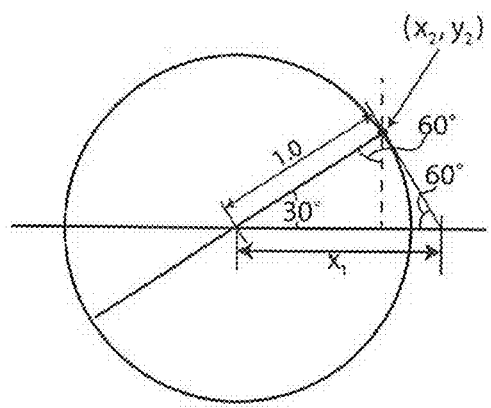
FIG. 9 is an enlarged piecewise linear segment, showing how the piecewise linear model of transmission line is constructed.

Note that Equations 24 and 25 include parameters that we shall call parameters a and b (a=1.15; b=0.58), which are used in generating the set of piecewise linear equations that populate data structures illustrated in FIGS. 12 and 13, discussed below. FIG. 9 shows how these parameters are trigonometrically calculated. In FIG. 9, note the point designated as $(x_2, y_2)$. From the angles defined we compute $x_2 = \cos(30°) = 0.866$; $y_2 = \sin(30°) = 0.5$. Next we calculate length $x_1$ as follows:

$$x_1 \sin(60°) = 1; \text{ thus } x_1 = 1.1547.$$

We need the equation of the line passing through $(x_1, 0)$ and $(x_2, y_2)$. This equation is:

$$\frac{x - x_1}{y - y_1} = \frac{x_1 - x_2}{y_1 - y_2}$$

$$\frac{x - 1.1547}{y - 0} = \frac{1.1547 - 0.866}{0 - 0.5}$$

$$x - 1.1547 = -2y(0.2887) = -0.5774 y$$

$$x + 0.5774 y = 1.1547$$

Since the axes denote P and Q, the equation of the constraining line is $P + 0.58 Q = 1.15$. If the radius is not 1.0 but $S_{max}$, then the equation is $$P + 0.58 Q = 1.15 S_{max}$$

It will be appreciated that the simplified piecewise linear representation shown in FIG. 8b can be used in many practical implementations. However in other applications, where higher accuracy is needed, the more complete set of piecewise linear equations represented by FIG. 8a is preferably used. Furthermore, it will be appreciated that although other possibilities exist for the linearization of the power flow equations, the techniques disclosed here apply to and cover those instances where piecewise linearization of the flow limits are used as described here, regardless of how the power flow constraints are represented.

Linearization of Transmission Line Loss (Loss Model)

Traditional DC power flow model is a lossless model. Real power loss is usually not considered in that model. However, in large power system with thousands of buses, real power loss can be substantial that it is not advisable to neglect it. In this report, we will develop a two-iteration algorithm to linearize real and reactive power loss.

From equation (6), if we make approximation that $\sin \theta_{km} = \theta_{km}$, $$\cos \theta_{km} = 1 - \frac{1}{2} \theta_{km}^2, V_m = 1.0 \text{ p.u.},$$

then we obtain:

$$P_k \approx \sum_{m \in S} (V_m G_{km} + B_{km} \theta_{km}) - \frac{1}{2} \sum_{m \in S} G_{km} \theta_{km}^2 \quad (26)$$

Note that the first part of equation (26) describes the real power flow that other buses receive from bus k, while the second part indicates the real power loss in the power transition.

Let us define:

$$P_{loss}^k = -\frac{1}{2} \sum_{m \in S} G_{km} \theta_{km}^2 \quad (27)$$

Total real power loss can be computed as:

$$P_{loss} = \sum_{k \in S} P_k = \sum_{k \in S} P_{loss}^k = -\frac{1}{2} \sum_{k \in S} \sum_{m \in S} G_{km} \theta_{km}^2 \quad (28)$$

If the states information at operating point are known, real power loss allocated to each node at that point can be computed as:

$$P_{loss}^{k0} = -\frac{1}{2} \sum_{m \in S} G_{km} (\theta_k^0 - \theta_m^0)^2 \quad (29)$$

Linearize equation (27) at operating point:

$$\Delta P_{loss}^k = -\sum_{m \in S} G_{km} (\theta_k^0 - \theta_m^0)(\Delta \theta_k - \Delta \theta_m) \quad (30)$$

Therefore, linearized real power loss allocated to each node is:

$$P_{loss}^k = P_{loss}^{k0} + \Delta P_{loss}^k \quad (31)$$
$$= -\sum_{m \in S} G_{km}(\theta_k^0 - \theta_m^0)(\theta_k - \theta_m) - P_{loss}^{k0}$$

Power flow equation considering transmission line loss would be:

$$P_k \approx \sum_{m \in S} V_m G_{km} - \sum_{m \neq k} B_{km}\theta_m - (B_{kk} - b_{kk})\theta_k + P_{loss}^k \quad (32)$$

Rearrange equation (32), and take equation (31) into equation (32), linearized real power flow equation incorporating real power loss can be calculated as:

$$P_k + P_{loss}^{k0} = \quad (33)$$
$$\sum_{m \in S} V_m G_{km} - \sum_{m \neq k}[B_{km} - G_{km}(\theta_k^0 - \theta_m^0)]\theta_m - \left[ B_{kk} - b_{kk} + \sum_{m \neq k} G_{km}(\theta_k^0 - \theta_m^0) \right]\theta_k$$

Linearized total real power loss equation is:

$$P_{loss} = \sum_{k \in S} P_{loss}^k = -\sum_{k \in S}\sum_{m \in S} G_{km}(\theta_k^0 - \theta_m^0)(\theta_k - \theta_m) - \sum_{k \in S} P_{loss}^{k0} \quad (34)$$

In the same manner, the reactive power flow equation can be derived. The conclusion will be presented as follows:

Linearized reactive power flow equation incorporating reactive power loss is:

$$Q_k + Q_{loss}^{k0} = -\sum_{m \in S} V_m B_{km} - \quad (35)$$
$$\sum_{m \neq k}[G_{km} + B_{km}(\theta_k^0 - \theta_m^0)]\theta_m - \left[ G_{kk} - g_{kk} - \sum_{m \neq k} B_{km}(\theta_k^0 - \theta_m^0) \right]\theta_k$$

where $$Q_{loss}^{k0} = \frac{1}{2}\sum_{m \in S} B_{km}(\theta_k^0 - \theta_m^0)^2 \quad (36)$$

Linearized total reactive power loss equation is:

$$Q_{loss} = \sum_{k \in S} Q_{loss}^k = -\sum_{k \in S}\sum_{m \in S} B_{km}(\theta_k^0 - \theta_m^0)(\theta_k - \theta_m) - \sum_{k \in S} Q_{loss}^{k0} \quad (37)$$

In matrix form, the linearized AC power flow equation considering transmission line loss can be stated as:

$$\begin{bmatrix} P + P_{loss}^0 \\ Q + Q_{loss}^0 \end{bmatrix} = \begin{bmatrix} \tilde{B}_p & \tilde{G}_p \\ \tilde{G}_q & \tilde{B}_q \end{bmatrix} \begin{bmatrix} \theta \\ V \end{bmatrix} \quad (38)$$

where coefficient matrixes $\tilde{B}_p, \tilde{G}_q, \tilde{G}_p, \tilde{B}_q$ are shown below.

$$\tilde{B}_p = \begin{bmatrix} -\left[B_{11} - b_{11} + \sum_{m \neq 1} G_{1m}(\theta_1^0 - \theta_m^0)\right] & -[B_{12} - G_{12}(\theta_1^0 - \theta_2^0)] & \cdots & -[B_{1N} - G_{1N}(\theta_1^0 - \theta_N^0)] \\ -[B_{21} - G_{21}(\theta_2^0 - \theta_1^0)] & -\left[B_{22} - b_{22} + \sum_{m \neq 2} G_{2m}(\theta_2^0 - \theta_m^0)\right] & \cdots & -[B_{2N} - G_{2N}(\theta_2^0 - \theta_N^0)] \\ \cdots & \cdots & \cdots & \cdots \\ -[B_{N1} - G_{N1}(\theta_N^0 - \theta_1^0)] & -[B_{N2} - G_{N2}(\theta_N^0 - \theta_2^0)] & \cdots & -\left[B_{NN} - b_{NN} + \sum_{m \neq N} G_{Nm}(\theta_N^0 - \theta_m^0)\right] \end{bmatrix}$$

$$\tilde{G}_q = \begin{bmatrix} -\left[G_{11} - g_{11} + \sum_{m \neq 1} B_{1m}(\theta_1^0 - \theta_m^0)\right] & -[G_{12} + B_{12}(\theta_1^0 - \theta_2^0)] & \cdots & -[G_{1N} + B_{1N}(\theta_1^0 - \theta_N^0)] \\ -[G_{21} + B_{21}(\theta_2^0 - \theta_1^0)] & -\left[G_{22} - g_{22} - \sum_{m \neq 2} B_{2m}(\theta_2^0 - \theta_m^0)\right] & \cdots & -[G_{2N} + B_{2N}(\theta_2^0 - \theta_N^0)] \\ \cdots & \cdots & \cdots & \cdots \\ -[G_{N1} + B_{N1}(\theta_N^0 - \theta_1^0)] & -[G_{N2} + B_{N2}(\theta_N^0 - \theta_2^0)] & \cdots & -\left[G_{NN} - g_{NN} + \sum_{m \neq N} B_{Nm}(\theta_N^0 - \theta_m^0)\right] \end{bmatrix}$$

$$\tilde{G}_p = \begin{bmatrix} G_{11} & G_{12} & \cdots & G_{1N} \\ G_{21} & G_{22} & \cdots & G_{2N} \\ \cdots & \cdots & \cdots & \cdots \\ G_{N1} & G_{N2} & \cdots & G_{NN} \end{bmatrix}, \tilde{B}_q = \begin{bmatrix} -B_{11} & -B_{12} & \cdots & -B_{1N} \\ -B_{21} & -B_{22} & \cdots & -B_{2N} \\ \cdots & \cdots & \cdots & \cdots \\ -B_{N1} & -B_{N2} & \cdots & -B_{NN} \end{bmatrix}$$

Case Study

To verify the advantages of the proposed linearized AC optimal power flow model, extensive simulations are conducted on the IEEE 24-bus reliability test system (RTS). It is a small-scale power system with 24 buses, 32 generators and 38 transmission lines. Total load demand is 2850 MW. Detailed data can be found in "IEEE reliability test system," IEEE Trans. Power App. Syst., vol. PAS-98, no. 6, pp. 2047-2054, November/December 1979. In this case study, full AC OPF, linearized AC OPF loss and lossless model and DC OPF all adopt the same generation cost, which is the cost after linearization, so that the comparisons among them can explicitly reflect their accuracy. The computer that implements these simulations has AMD Dual-Core A4-3420 Accelerated Processor @2.8 GHz with 3.49 GB RAM. The simulations are programmed in MATLAB environment.

Table 3 compares the results obtained between full AC OPF, linearized AC OPF lossless model, linearized AC OPF loss model and DC OPF. It shows that DC model achieves the minimal calculation time, however, the error obtained is substantial although acceptable in some circumstances. While linearized AC OPF lossless model can decrease this error tremendously by only sacrificing small computational time. Linearized AC OPF lossless model could also provide voltage magnitude information shown in FIG. 5. However, when loss cannot be neglected in certain low voltage system or large system, linearized AC OPF loss model can be used. Table 3 shows that in RTS system, the loss error calculated by linearized AC OPF loss model is 2.57%, while the computation time can be shorten to 11%, compared with full AC OPF. Linearized AC OPF loss model requires two iterations; therefore it costs approximately twice time as lossless model as displayed in Table 3.

Conclusion

This disclosure presents a complete and generic linearized optimal power flow framework for OPF problems. In the first part of the disclosure, a linearized AC power flow lossless model is developed. This model not only can provide more accurate results than DC model, but also provide voltage and reactive power flow information, which DC model cannot achieve. Meanwhile, it can also be solved by LP method, therefore the speed and reliability is guaranteed. Then, to help accommodate this model into LP problem category, this report presents a piecewise method to linearize transmission line constraints. However, for some low voltage networks, power loss can be too substantial to be neglected. Therefore, a two-iteration algorithm is proposed to develop a linearized AC power flow loss model. Simulation results show that this linearized AC power flow loss model can be solved tremendously faster than full AC power flow model while the accuracy is only slightly compromised. This framework is capable to be used for online computation applications.

TABLE 3

Simulation results for RTS system

| Method | Computing time Value (s) | Cost Value ($/hr) | Error | Loss Value (MW) | Error |
|---|---|---|---|---|---|
| AC OPF | 2.34 | $6.36 \times 10^4$ | 0 | 46.30 | 0 |
| DC OPF | 0.07 | $6.12 \times 10^4$ | 3.78% | 0 | 100% |
| Linearized AC OPF lossless | 0.119 | $6.34 \times 10^4$ | 0.31% | 0 | 100% |
| Linearized AC OPF loss model | 0.25 | $6.35 \times 10^4$ | 0.16% | 45.11 | 2.57% |

Implementation

Figure 11:
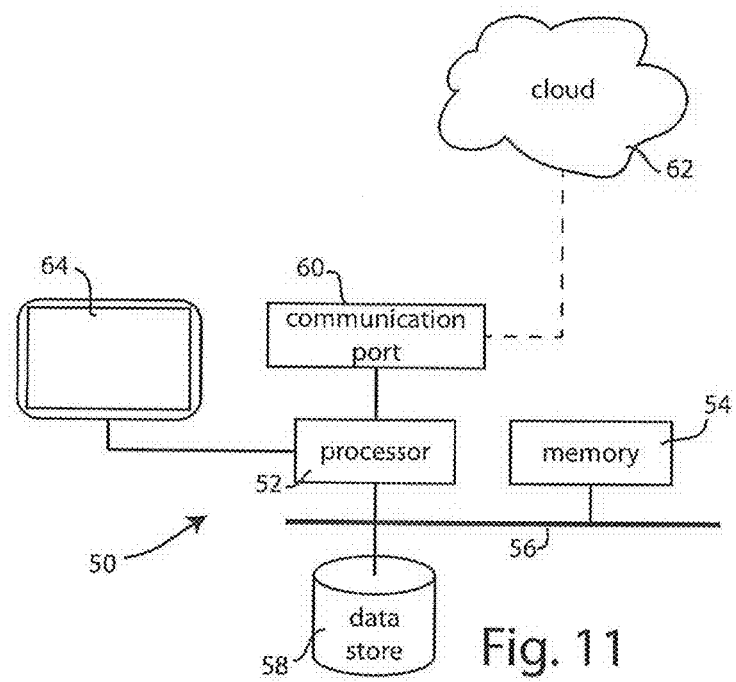
FIG. 11 is a computer hardware diagram depicting one embodiment of the computer-implemented tool implementing the linear optimal power flow system.

Referring to FIG. 11, an exemplary embodiment of a computer-implemented power flow analyzer is illustrated at 50. The system includes a processor 52 with associated computer memory 54 coupled via the computer bus 56 to allow the processor to access memory 54, both to obtain program instructions to implement the linear optimal power flow algorithm and to access data structures used with the optimal power flow algorithm. The computer-implemented power flow analyzer also includes a data store 58 in which data consumed by the power flow algorithm are stored awaiting computation. In addition, the processor may include a communication port 60 to couple the processor to the Internet, to a computer network, such as a cloud network or to some other source of data consumed by the power flow algorithm. For general illustration purposes this remote source of data has been illustrated as a cloud source 62. The processor is also provided with a suitable display 64 onto which a user interface is presented. The power engineer interacts with this user interface to specify the parameters of the optimization process to be performed and to specify or select the constraints against which the optimization process shall be run.

Figure 12:
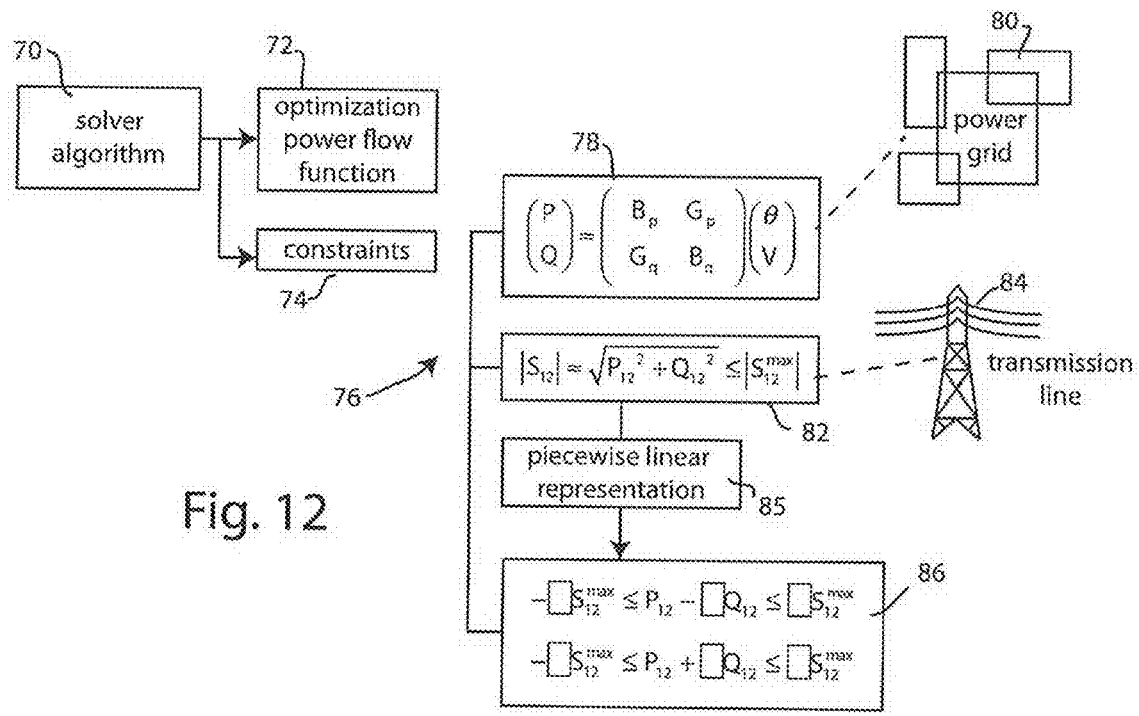
FIG. 12 is a functional block diagram of the computer-implemented tool of FIG. 11

FIG. 12 shows how the processor 52 is configured via program instructions stored in memory 54. The processor is programmed to implement a solver algorithm 70, such as linear programming solver algorithm. For more information on suitable solver algorithms, reference may be had to Wood, A. and Wollenberg, B, "Power Generation, Operation, and Control," Second Ed., John Wiley & Sons, Inc. Section 13.4 and to the references cited in that chapter.

The solver algorithm 70 operates on an optimization power flow function 72, which may be specifically specified by the power engineer by interaction through the user interface on display 64. The power flow function 72 is optimized by the solver algorithm 70 while taking into account a set of constraints 74, which are stored in memory 54 according to a set of predefined data structures depicted generally at 76.

Specifically, the set of data structures includes a power flow model data structure 78, configured as a matrix in accordance with Equation 16 above. It will be appreciated that Equation 16 represents the linearized AC power flow model at a high level. The actual details of this matrix would be stored in memory 54 as a set of matrix tables or arrays, corresponding to the bus admittance matrix described by the definitional terms of Equation 16 (where the respective Bq and Gq matrices are explained in detail). The AC power flow model stores data obtained from the power grid 80 being studied. Data for the power grid being studied are stored in data store 58, or downloaded from a remote source, such as cloud 62, as described above.

The power flow data structure 78 illustrated in FIG. 12 corresponds to the lossless model, in which power line losses are not considered. If desired, however, the power flow analyzer can be configured to employ a loss model that takes line losses into account. The power engineer can select whether to employ a lossless model or a loss model through interaction via the interface of display 64. In the loss model, the data structure 78 is modified to include the P and Q loss terms, which are also stored in memory 54, based on Equation 38 presented above.

In addition, the data structures 76 also include a transmission line model data structure 82 which models the transmission line(s) 84 used in the power grid being studied. The transmission line model corresponds to Equation 22 above. More specifically, the transmission line model data structure 82 is converted, as noted at 85 into a piecewise linear representation, which may be stored as a set of stored values based on the piecewise linear representation data structure shown at 86.

Figure 13:
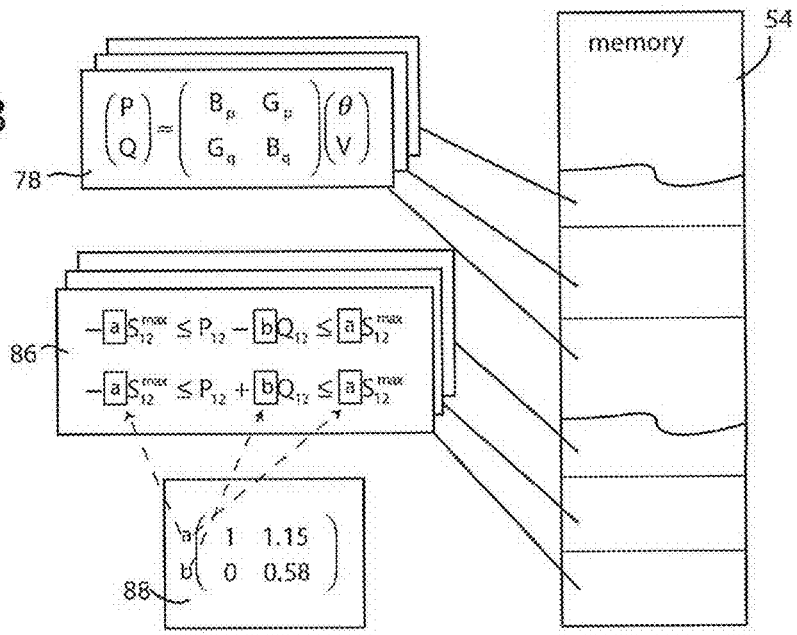
FIG. 13 is a data structure diagram illustrating how the computer system of FIG. 11 is programmed to implement the linear optimal power flow system.

FIG. 13 shows the data structure representations in greater detail. As illustrated, the power flow model data structure 78 and piecewise linear representation data structure 86 are stored in different regions that have been allocated in memory 54 for those respective purposes. As diagrammatically illustrated, the power flow model is preferably represented as a plurality of matrix records, each corresponding to a different node within the power grid. The piecewise linear representations 86 comprise a series of expressions that include parameters (shown in FIG. 13 as parameters a and b) that are in turn supplied by a parameter matrix 88. These parameters, when plugged into the appropriate designations in the series of expressions, comprise the piecewise linear representations. As with the power flow model, the memory 54 is allocated with space to store the corresponding set of piecewise linear representations for each transmission line 84 being modeled in the power grid.

In implementing the solver algorithm 70, the processor 52 is programmed to perform linear programming upon the optimization power flow function, supplied by the power engineer, while ensuring that all constraints, stored in data structures 78 and 86 are met. The precise nature of the power flow function to be optimized will of course depend on the power engineer's focus of interest. The optimization function is expressed by the engineer using parameters which include the constraints identified by data structures 78 and 86. The processor then iteratively performs the linear programming solver algorithm until it converges upon a solution or the process aborts for reason of failure to converge.

Figure 14:
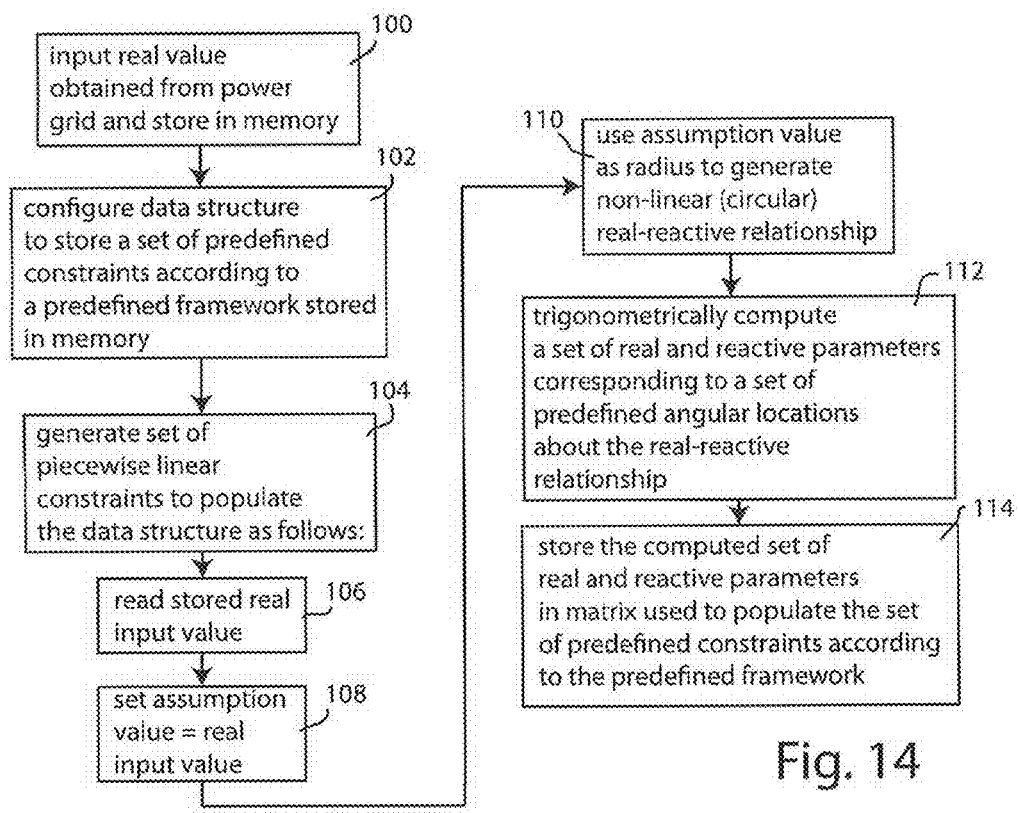
FIG. 14 is a flow chart diagram further illustrating how the computer system of FIG. 11 is programmed to generate the set of piecewise linear constraints used in the linear optimal power flow system.

In order to linearize the constraints to allow the linear programming solver algorithm to operate, a set of piecewise linear constraints need to be generated by the computer. FIG. 14 illustrates this process.

The piecewise linear constraints are generated based on a seed value obtained from a real (as opposed to reactive) value obtained from the power grid. This real value may be obtained by user input via the user interface associated with display 64 (FIG. 1), or by input through the communication port 60 as live or real-time data, or by input via either user interface or port 60 and stored in the data store 58 (step 100). It should be noted that although real-world values representing the real component values from the power grid are input at step 100, these values are actually used as seed values which the processor uses to generate parameters used to create the set of piecewise linear constraints.

In addition to inputting real values, the processor is also programmed to configure a specific data structure, by allocating space in memory 54 according to a predefined framework stored in memory as part of the program instructions. This data structure corresponds to the structures depicted at 78 and 86 in FIG. 13. With reference to the data structure shown at 86, note that it contains a set of parameters, designated generally by letters a and b. These parameters are populated with values that are generated by processor 52 according to the steps shown at 102-114. Specifically, the framework defines data structure 86 to represent a set of piecewise linear constraints. Although shown in FIG. 13 as a set of inequality equations, in the actual computer implementation each inequality relationship may be stored separately. Thus while two inequality relationships per line are expressed in FIG. 13 at 86, these would be stored as two separate inequality relationships in memory.

As depicted at step 104, the processor generates a set of piecewise linear constraints to populate the parameters a and b by executing the steps 106 through 114. The steps depicted in FIG. 14 show how to generate a set of parameters for one piecewise linear constraint. It will be understood that this process is repeated iteratively until all piecewise linear constraints for all input real values have been generated.

The generation process begins by reading the stored real input value (step 104) that was stored in memory at step 100. The value read is used as an assumption value variable, in temporary storage memory, such that the assumption value is set equal to the stored real input value. The assumption value may be considered as a seed value that will be used by the processor to calculate a set of parameters used to populate data structure 86. This is performed at step 110, where the assumption value is used as a radius to generate a non-linear (in this case circular) real-reactive relationship locus. This non-linear relationship was illustrated in FIG. 7 and in FIGS. 8a and 8b.

Next the processor (step 112) applies predefined trigonometric functions, corresponding to the explanation of FIG. 9, to compute a set of real and reactive parameters. These parameters correspond to a set of predefined angular locations about the real-reactive relationship locus. For illustration purposes in FIGS. 8a and 8b, and in FIG. 9, the angular locations are equally spaced at 30-degree intervals around the circular locus, so that the P and Q axis intercepts are included. Of course other angular locations may be used as well, and these need not necessarily be equally spaced. In this regard, FIG. 8b illustrates one case where the angular locations are not equally spaced. Other spacing configurations, including asymmetric spacings, are also possible.

The computed set of real and reactive parameters may be stored in a suitable temporary matrix data structure 88 (FIG. 13) and then used to populate the parameters a and b in data structure 86 to define the set of predefined constraints as indicated at step 114.

Through the process outlined above, the processor will generate a potentially large number of piecewise linear constraints, depending on the size of the power grid. Although a large number of constraints are generated, these are all linear constraints and, as such, may be operated upon by the linear programming solver algorithm 70 in a very efficient manner.

In summary, the programmed processor thus implements a tool for optimizing power flow problems using a linear optimal power flow technique. According to that technique the processor generates and represents the constraint(s) as set(s) of piecewise linear constraints which are calculated according to a predefined framework. The processor operates upon input real-world values (e.g., a real as opposed to reactive value) treating these as seed values that the processor then uses to generate a set of plural parameterized piecewise linear constraints for each seed value.

The computer-implemented tool and method thus advantageously casts the power grid optimization problem in terms of both real and reactive components, which it linearizes by generating piecewise linear constraints, thereby allowing a linear programming solver to operate upon an optimization function within these linearized constraints.

Further Enhanced Linear Optimal Power Flow Embodiment

By way of further example, an additional enhanced linear optimal power flow embodiment will next be discussed. This additional embodiment represents a significant improvement over conventional optimal linear power flow techniques with dc constraints. In general the disclosed enhanced linear optimal power flow embodiment can be employed in all instances that would traditionally use conventional optimal linear power flow techniques with dc constraints. To be clear the proposed model disclosed here is not intended to replace ac power flow (using non-linear equations) (ACPF) and optimal (non-linear) power flow with ac constraints (ACOPF), where the accuracy of the exact non-linear solution is necessary and practical to implement; it is, rather, presented as a superior alternative to other models that are used in situations where the exact solutions are either unnecessary or impractical to implement. The probabilistic planning applications described in this disclosure—reliability, production simulation, and transmission planning—constitute examples of such situations. The superiority of the proposed model over other models in the literature lies in that the proposed model incorporates the following features: (a) it is non-iterative; (b) it includes security constraints; (c) it can include transmission (or distribution) losses; (d) it constrains MVA flows, not just MW flows; and (e) in addition to the usual P–θ and Q–|V| couplings, it considers the P–|V| and Q–θ couplings as well, which are important in networks with lower X/R ratios. Furthermore, the optimization frameworks proposed here use linearized constraint sets, so sensitivities can easily be estimated using dual solutions (shadow prices).

The enhanced linear optimal power flow embodiment described here may be implemented using technical systems essentially as previously described in connection with FIGS. 11-14, with suitable modification of the matrix variables and calculations to conform to the enhanced linear power flow optimization framework as will be next discussed.

Development of the Enhanced Linear Power Flow Optimization Framework

Most probabilistic planning applications, such as reliability, production simulation, and transmission planning, employ optimization problems of the following form.

Min/Max Objective function
Subject to
Power balance constraints (equality)
Security constraints (inequality)

In many instances, the objective functions are linear, and if the constraints are linearized, they can be solved using established linear programming (LP) techniques.

Reliability evaluations are mostly concerned with redispatch/remedial action scenarios that see to minimize the total system curtailment, formulating the problem as $$\text{Min}\left(\sum_{i=1}^{n_b} w_i P_{Ci}\right)$$

where $P_{Ci}$ and $w_i$ are the power curtailed at bus i and the weight thereof, based on its priority, and $N_b$ is the number of buses. Variations exist, ranging from using unity weights to splitting the load at each bus and assigning them different weights. Another variant of the above formulation is of the form $$\text{Max}\left(\sum_{i=1}^{n_b} x_i P_{Di}\right)$$

where $P_{Di}$ and $x_i$ are the connected load at bus i and the fraction of this load that the dispatch can satisfy. If the constraints are linear, these problems are solved using LP.

Production cost evaluations are concerned with minimizing the total generation cost over a planning horizon (study period). The generation cost of a generator can be formulated, for simplicity, as a linear (or affine) function of the real power output of that generator, or more frequently, as non-linear function. A non-linear objective function, with linearized constraints, can be formulated as a quadratic programming problem. Alternatively, the generating cost can be reformulated as a piecewise linear function as described below, and the problem can be solved using LP. In either of these approaches, the constraints can be linearized as described in the next section.

Transmission expansion planning seeks to minimize the sum of total capital cost of new transmission and total generation cost. These methods, too, frequently employ linearized constraints, and solve the problem using mixed integer linear programming. The generation cost function may be linearized as described below, and the constraint set can be enhanced as described in the next section.

Generation Cost Function

Figure 15:
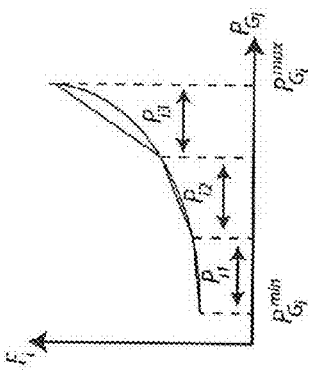
FIG. 15 is a graphical depiction of a linearization of the cost function curve.

Now, let us consider the typical nonlinear cost curve of a generating unit i depicted in FIG. 15. Such cost curve can be approximated by a series of linear segments with different slopes. For instance, this cost curve is approximated with three linear segments of $P_{i1}$, $P_{i2}$, and $P_{i3}$, with slopes of $h_1$, $h_2$, and $h_3$. Therefore, the cost function can be approximated as follows.

$$F_i(P_{Gi}) = F_i(P_{Gi}^{min}) + h_1 P_{i1} + h_2 P_{i2} + h_3 P_{i3} \tag{39}$$

where, $$P_{Gi} = P_{Gi}^{min} + P_{i1} + P_{i2} + P_{i3} \tag{40}$$

and, $$P_{Gi}^{min} \leq P_{Gi} \leq P_{Gi}^{max} \tag{41}$$

Note that in reality, it is required for a generator starting to generate power from segment 2 only after generating all the power in segment 1. Since the cost function of generators are convex, when the objective function is to minimize generation cost, the linear program will automatically make the generators produce sequentially from segment 1, segment 2 and so on.

Linearization of Constraints

In this section, the linearization of the equality constraints, i.e., the power flow equations, and the inequality constraints, i.e., the generation and transmission capacity limits, will be developed. In the linearized power flow relationships presented here, both real and reactive power, and the coupling between them, will be considered, and the manner of including real and reactive power losses will be described. In the generation and transmission capacity limits, too, both real and reactive power components will be considered. It will be shown later that the proposed framework provides for high accuracy, closely approaching that of non-linear methods.

Linearization of Power Balance Condition

The ACPF equations are of the form, $$P_k = V_k \sum_{m \in \Omega_k} V_m(G_{km}\cos\theta_{km} + B_{km}\sin\theta_{km}) \tag{42}$$

$$Q_k = V_k \sum_{m \in \Omega_k} V_m(G_{km}\sin\theta_{km} - B_{km}\cos\theta_{km}) \tag{43}$$

where $P_k$ and $Q_k$ are real and reactive power injected into node k; $V_k$ and $V_m$ are voltage magnitudes at buses k and m; $\Omega_k$ is the set of all the buses in the system. $\theta_{km}=\theta_k-\theta_m$, $\theta_k$ and $\theta_m$ being the angles of the voltage phasors at buses k and m; $G_{km}$ and $B_{km}$ are the real and reactive part of $Y_{km}$, the (k,m)th element of bus admittance matrix.

The voltage magnitudes $V_k$ and $V_m$ can be represented as $$V_k = 1.0 + \Delta V_k \tag{44}$$

$$V_m = 1.0 + \Delta V_m \tag{45}$$

and $\cos\theta_{km}$ and $\sin\theta_{km}$ can be represented as $$\cos\theta_{km} = 1 - \frac{\theta_{km}^2}{2} + \ldots \tag{46}$$

$$\sin\theta_{km} = \theta_{km} - \frac{\theta_{km}^3}{6} + \ldots \tag{47}$$

Now (42) can be rewritten as $$P_k = \sum_{m \in \Omega_k} (1 + \Delta V_k + \Delta V_m + \Delta V_k \Delta V_m) \tag{48}$$

$$\left\{ G_{km}\left(1 - \frac{\theta_{km}^2}{2} + \ldots\right) + B_{km}\left(\theta_{km} - \frac{\theta_{km}^3}{6} + \ldots\right)\right\}$$

Considering that the $\Delta V$ and $\theta_{km}$ are relatively small in magnitude, it is reasonable to neglect higher order terms and products of these terms. Then as a first approximation, we have $$P_k \approx \sum_{m \in \Omega_k} \{B_{km}\theta_{km} + (1 + \Delta V_m + \Delta V_k)G_{km}\} = \tag{49}$$

$$\sum_{m \in \Omega_k} \{B_{km}\theta_{km} + G_{km}V_m\} + \Delta V_k \sum_{m \in \Omega_k} G_{km}$$

Before simplifying (49), consider the following.

$$G_{km} = \begin{cases} \sum_{\substack{n \in \Omega_k \\ n \neq k}} g_{kn} + g_{kk} & \text{for } m = k \\ -g_{km} & \text{for } m \neq k \end{cases}$$

where $g_{kk}$ is the total shunt conductance connected to bus k. Then, $$\sum_{m \in \Omega_k} G_{km} = -g_{k1} - \ldots + \left(\sum_{m \neq k} g_{km} + g_{kk}\right) - \ldots - g_{kN} \tag{50}$$

$$= g_{kk}$$

where N is the number of buses. Substituting (50) in (49), we get $$P_k \approx \sum_{m \in \Omega_k} (B_{km}\theta_{km} + G_{km}V_m) + V_k g_{kk} \tag{51}$$

As the second and final approximation we neglect $\Delta V_k g_{kk}$ to get $$P_k \approx \sum_{m \in \Omega_k} (B_{km}\theta_{km} + G_{km}V_m) \tag{52}$$

$$= \sum_{m \in \Omega_k} (B_{km}\theta_k - B_{km}\theta_m + G_{km}V_m)$$

$$= \sum_{m \in \Omega_k} (-B_{km}\theta_m + G_{km}V_m) + \theta_k \sum_{m \in \Omega_k} B_{km}$$

$$= \sum_{m \in \Omega_k} (-B_{km}\theta_m + G_{km}V_m) + \theta_k b_{kk}$$

where the last term in (52) is obtained through a simplification similar to (50), $b_{kk}$ being the total shunt susceptance connected to bus k.

It is easy to see that a linear approximation of (43) can be similarly obtained as $$Q_k = \sum_{m \in \Omega_k} (-G_{km}\theta_m - B_{km}V_m) + \theta_k g_{kk} \tag{53}$$

In the proposed enhanced linear flow representation, the approximations (52) and (53) are treated as equalities, and compactly represented as $$\begin{bmatrix} P \\ Q \end{bmatrix} = \begin{bmatrix} -B' & G \\ -G' & -B \end{bmatrix} \begin{bmatrix} \theta \\ V \end{bmatrix} \tag{54}$$

where G and B are, respectively, the real and imaginary parts of the bus admittance matrix, and G' and B' are modified conductance and susceptance matrices obtained by removing the shunt admittances from the diagonal elements, as shown below.

$$B' = \begin{bmatrix} (B_{11}-b_{11}) & B_{12} & \ldots & B_{1N} \\ B_{21} & (B_{22}-b_{22}) & \ldots & B_{2N} \\ \vdots & \vdots & \ddots & \vdots \\ B_{N1} & B_{N2} & \ldots & (B_{NN}-b_{NN}) \end{bmatrix}$$

$$G' = \begin{bmatrix} (G_{11}-g_{11}) & G_{12} & \ldots & G_{1N} \\ G_{21} & (G_{22}-g_{22}) & \ldots & G_{2N} \\ \vdots & \vdots & \ddots & \vdots \\ G_{N1} & G_{N2} & \ldots & (G_{NN}-g_{NN}) \end{bmatrix}$$

From equation (54), it is shown that the proposed linearized AC power flow model can indicate voltage magnitude and reactive power information for the network. Note that in the Taylor Series of $\cos\theta_{km}$, the term $$-\frac{\theta_{km}^2}{2}$$

contributes for the losses from the series impedance of transmission lines. Since the formulation developed in this section neglects the term $$-\frac{\theta_{km}^2}{2},$$

it does not include the losses from the series impedance of the transmission lines. However, it does include the losses from the shunt parts, which comes from the diagonal values of B and G matrices.

Inclusion of Losses

Traditional DC power flow model and the linearized power flow model developed in the above section "Linearization of Power Balance Condition" are lossless models. In large power system with thousands of buses, real power loss can be substantial that it is not advisable to be neglected.

From (48), if we keep the term of $$-\frac{\theta_{km}^2}{2};$$

while neglect other higher order terms of $\Delta V$ and $\theta_{km}$, then we obtain, $$P_k \approx \sum_{m \in \Omega_k}(V_m G_{km} + B_{km}\theta_{km}) - \frac{1}{2}\sum_{m \in \Omega_k} G_{km}\theta_{km}^2 + \Delta V_k g_{kk} \quad (55)$$

If we still ignore the small portion $\Delta V_k g_{kk}$, then:

$$P_k \approx \sum_{m \in \Omega_k}(V_m G_{km} + B_{km}\theta_{km}) - \frac{1}{2}\sum_{m \in \Omega_k} G_{km}\theta_{km}^2 \quad (56)$$

Note that the first part of (56) describes the real power flow that other buses receive from bus k, while the second part indicates the real power loss in the power transition, Let us define, $$P_{loss}^k = -\frac{1}{2}\sum_{m \in \Omega_k} G_{km}\theta_{km}^2 \quad (57)$$

Eqn. (57) explicitly indicates active power loss is a quadratic form of $\theta_{km}$. $G_{km}$, real part of Y is always non-positive, hence $P_{loss}^k$ is a non-negative number. It may be realized by modeling the absolute form in LP context, as described in AIMMS Modeling Guide—Linear Programming Tricks. [online], available at http://www.aimms.com/aimms/download/manuals/aimms3om_linearprogrammingtricks.pdf. The present disclosure presents a piecewise linearization of active power loss for the proposed ELOPF.

Figure 16:
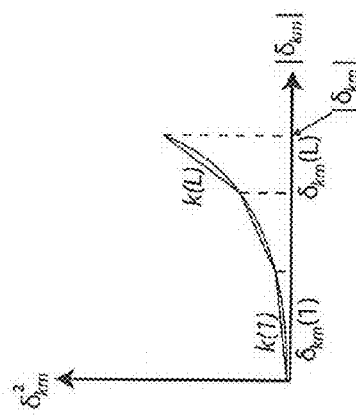
FIG. 16 is a graphical depiction illustrating piecewise linearization of $\delta_{km}^2$.

FIG. 16 displays linearization of $\theta_{km}^2$ by L linear segments. k(i) is the slope of $i^{th}$ segment. $|\theta_{km}|_{max}$ is a constant describing the maximum angle difference between two adjacent buses. Therefore, the expression of $\theta_{km}^2$ is:

$$\theta_{km}^2 = \sum_{i=1}^{L} k(i)\Delta\theta_{km}(i) \quad (58)$$

where, the slope of linear segment is:

$$k(i) = (2i-1)|\theta_{km}|_{max}/L \quad (59)$$

and $\Delta\theta_{km}(i)$ satisfies:

$$|\theta_{km}| = \sum_{i=1}^{L}\Delta\theta_{km}(i) \quad (60)$$

$$0 \leq \Delta\theta_{km}(i) \leq |\theta_{km}|_{max}/L \quad (61)$$

Since $k(i) < k(j)$ when $i < j$, therefore, $\Delta\theta_{km}(i)$ with smaller i will be chosen first. To establish the linear relationship between $\theta_{km}$ and $|\theta_{km}|$, two non-negative variables $\theta_{km}^+$ and $\theta_{km}^-$ are created [26].

$$\theta_{km} = \theta_{km}^+ - \theta_{km}^- \quad (62)$$

$$|\theta_{km}| = \theta_{km}^+ + \theta_{km}^- \quad (63)$$

where $\theta_{km}^+ \geq 0$, $\theta_{km}^- \geq 0$. Note that for each $\theta_{km}$, at least one of the values $\theta_{km}^+$ and $\theta_{km}^-$ is zero. When $\theta_{km} \geq 0$, $\theta_{km} = \theta_{km}^+$ and $\theta_{km}^- = 0$; When $\theta_{km} \geq 0$, $\theta_{km} = \theta_{km}^-$ and $\theta_{km}^+ = 0$. Assume that both $\theta_{km}^+$ and $\theta_{km}^-$ are positive, let $w = \min\{\theta_{km}^+, \theta_{km}^-\} > 0$. Subtracting w from $\theta_{km}^+$ and $\theta_{km}^-$, the value of $\theta_{km}$ will remain the same, but $|\theta_{km}|$ will be reduced by 2w, which means the active power loss, as well as generation cost, can be reduced. This contradicts optimizing objective function values of generation cost. Therefore, one of $\theta_{km}^+$ and $\theta_{km}^-$ should be zero.

Hence the linear expression of active power loss is:

$$P_{loss}^k = -\frac{1}{2}\sum_{m \in \Omega_k}\sum_{i=1}^{L} G_{km}k(i)\Delta\theta_{km}(i) \quad (64)$$

Similarly, $$Q_{loss}^k = \frac{1}{2}\sum_{m \in \Omega_k} B_{km}\theta_{km}^2 \quad (65)$$

Therefore, the linear expression of reactive power loss is:

$$Q_{loss}^k = \frac{1}{2}\sum_{m \in \Omega_k}\sum_{i=1}^{L} B_{km}k(i)\Delta\theta_{km}(i) \quad (66)$$

Note that (64) and (66) only include the losses produced by the series impedance of transmission lines. Losses produced from the shunt part of the transmission lines have already been considered in the original formulation expressed by (54).

Power Balance Equations

Power balance equations are equality constraints representing the sum of the power at a certain bus. These balance equations are basically derived from the linearized power flow solution developed above. Mathematically, power balance equations posed as, $$B'\theta - GV + P_G - P_{loss} = P_D$$

$$G'\theta + BV + Q_G - Q_{loss} = Q_D \quad (67)$$

where, $\theta$ is the vector of bus voltage angles; V is the vector magnitudes of bus voltages; $P_G$ and $Q_G$ are the vectors of the real and reactive power of the generators respectively; $P_{loss}$ is linear active power loss expressed by (64); $Q_{loss}$ is linear reactive power loss expressed by (66) and $P_D$ and $Q_D$ are the vectors of the real and reactive power of the bus loads, respectively.

As can be clearly seen from (67), reactive power and bus voltage have both been considered in the proposed LP framework. This is absolutely a key and crucial advantage of the proposed ELPF based LP framework when compared to the traditional DCPF based LP in which such aspects were ignored.

Line Flow Constraints

In traditional DC optimal power flow based model, reactive power flow is always not considered. Power flow constraints of transmission lines are simply assumed to be real power flow constraints, which can be stated as (68). This simplification will introduce considerable error in the optimal power flow calculation, since reactive power flow sometimes takes up a non-neglectable portion in the power flow of transmission line.

$$|P_{ij}| \le |S_{ij}^{max}| \tag{68}$$

Figure 17:
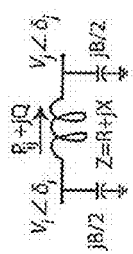
FIG. 17 is a circuit diagram of a two node simple system.

In the linearized power flow proposed in section 3.1, it is accessible to obtain voltage magnitude and reactive power state information. Consequently, it provides a prerequisite to linearize transmission line constraint considering reactive power. Now, let us consider the simple two bus system shown in FIG. 17.

Power flow in this transmission line can be calculated as, $$P_{ij} = \frac{R}{Z^2} V_i^2 - V_i V_j \left( \frac{R}{Z^2} \cos\theta_{ij} - \frac{X}{Z^2} \sin\theta_{ij} \right) \tag{69}$$

$$Q_{ij} = -V_i^2 \left( \frac{B}{2} - \frac{X}{Z^2} \right) - V_i V_j \left( \frac{X}{Z^2} \cos\theta_{ij} + \frac{R}{Z^2} \sin\theta_{ij} \right) \tag{70}$$

Practically, the difference between $\theta_i$ and $\theta_j$ is not significant, it is reasonable to make the approximation that $\sin\theta_{ij} \approx \theta_{ij}$, $\cos\theta_{ij} \approx 1$. Considering in the transmission system, R=X. Therefore, it is also acceptable to approximate that $R \approx 0$, $X \approx Z$. When the system is operated near operating point, then we have $V_i \approx 1.0$ p.u., $V_j \approx 1.0$ p.u. Consequently, equations (69) and (70) can be simplified as:

$$P_{ij} = \frac{\theta_i - \theta_j}{X} \tag{71}$$

$$Q_{ij} = -V_i \frac{B}{2} + \frac{V_i - V_j}{X} \tag{72}$$

Originally, expression of transmission line power flow constraint is, $$|S_{ij}| = \sqrt{P_{ij}^2 + Q_{ij}^2} \le |S_{ij}^{max}| \tag{73}$$

Figure 18:
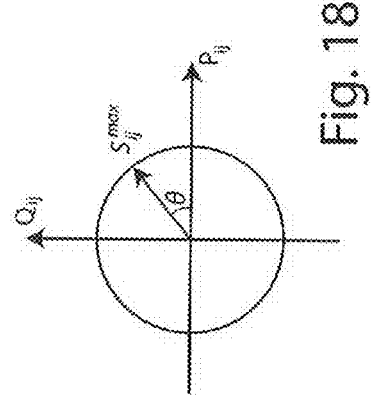
FIG. 18 is a transmission line constraint diagram.

Eq. (73) indicates that eligible real and reactive power flow without violating transmission line constraint is bounded by a circle, whose radius is $S_{ij}^{max}$. The circle shown in FIG. 18 depicts the boundary restricting real and reactive power flow of transmission line. Obviously, the constraint is not linear.

Figure 19A:
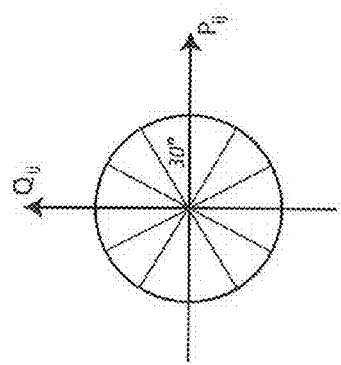
FIGS. 19a and 19b are constraint diagrams, FIG. 19a depicting approximation of circular boundary and FIG. 19b depicting linear constraints for transmission line.

To linearize such a constraint, a piecewise approximation of the boundary can be utilized. In FIG. 19a, a total number of twelve straight lines expressed in equations (74)-(79) are adopted to approach the circular boundary. Eqs (36) and (37) depict the four segments perpendicular to P or Q axes. Eqs (38) and (39) are represented for the four segments which are 60° deviated from P axis. The rest of the four segments which are 60° deviated from Q axis are described by (40) and (41).

$$-S_{ij}^{max} \le P_{ij} \le S_{ij}^{max} \tag{74}$$

$$-S_{ij}^{max} \le Q_{ij} \le S_{ij}^{max} \tag{75}$$

$$-1.15 S_{ij}^{max} \le P_{ij} - 0.58 Q_{ij} \le 1.15 S_{ij}^{max} \tag{76}$$

$$1.15 S_{ij}^{max} \le P_{ij} + 0.58 Q_{ij} \le 1.15 S_{ij}^{max} \tag{77}$$

$$1.15 S_{ij}^{max} \le Q_{ij} - 0.58 P_{ij} \le 1.15 S_{ij}^{max} \tag{78}$$

$$-1.15 S_{ij}^{max} \le Q_{ij} + 0.58 P_{ij} \le 1.15 S_{ij}^{max} \tag{79}$$

Figure 19B:
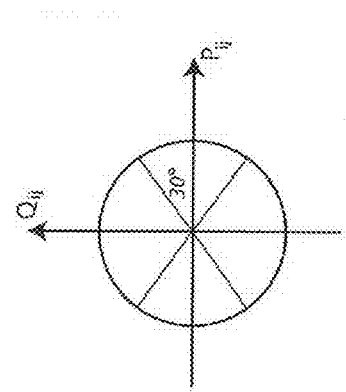

Substitute (71) and (72) into (74)-(79), linear constraints of transmission lines for $\theta$ and V can be obtained by (80)-(85). If a set of transmission lines are known to have predominantly real power flowing, their number of constraints can be reduced to six shown in FIG. 19b and expressed by equations (80), (82) and (83).

$$-S_{ij}^{max} \le \frac{\theta_i - \theta_j}{X} \le S_{ij}^{max} \tag{80}$$

$$-S_{ij}^{max} \le -V_i \frac{B}{2} + \frac{V_i - V_j}{X} \le S_{ij}^{max} \tag{81}$$

$$-1.15 S_{ij}^{max} \le \frac{\theta_i - \theta_j}{X} - 0.58 \left( -V_i \frac{B}{2} + \frac{V_i - V_j}{X} \right) \le 1.15 S_{ij}^{max} \tag{82}$$

$$-1.15 S_{ij}^{max} \le \frac{\theta_i - \theta_j}{X} + 0.58 \left( -V_i \frac{B}{2} + \frac{V_i - V_j}{X} \right) \le 1.15 S_{ij}^{max} \tag{83}$$

$$-1.15 S_{ij}^{max} \le -V_i \frac{B}{2} + \frac{V_i - V_j}{X} - 0.58 \frac{\theta_i - \theta_j}{X} \le 1.15 S_{ij}^{max} \tag{84}$$

$$-1.15 S_{ij}^{max} \le -V_i \frac{B}{2} + \frac{V_i - V_j}{X} + 0.58 \frac{\theta_i - \theta_j}{X} \le 1.15 S_{ij}^{max} \tag{85}$$

In general, the number of constraints can be selected depending on the individual situations. If high accuracy is expected, a larger number of constraints can be utilized to approach the circle constraint. If less computation is preferred, fewer number of constraints can be used. The degree of the diameters which is perpendicular to the constraints is also a variable that can be selected based on preference.

Generator Limits

Figure 20:
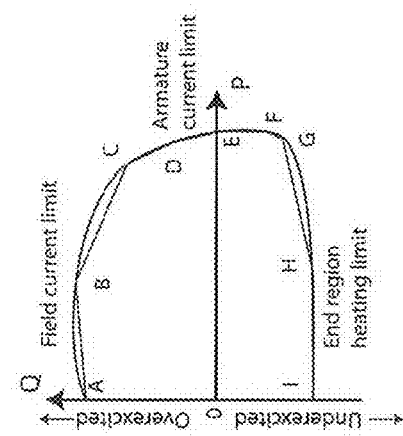
FIG. 20 is a reactive capability curve.

The ratings of synchronous generators are usually given in terms of MVA at a specified voltage and power factor. The maximum active power output is restricted by the prime mover capability, which is usually a value smaller than MVA rating. The reactive power output limit is depicted by a reactive capability curve shown in FIG. 20. The figure shows that in the overexcited area, reactive power output is limited by field heating for low power factors and armature heating for high power factors.

Most power flow programs take a conservative value for $P_{max}$, usually 95% of the actual value. The maximum and minimum limits of reactive power can be obtained at the lagging limit and leading limit respectively shown in FIG. 20. Therefore, the constraints of generator units as can be expressed as:

$$P_G^{min} \le P_G \le P_G^{max} \tag{86}$$

$$Q_G^{min} \le Q_G \le Q_G^{max} \tag{87}$$

where, $P_G^{min}$ and $P_G^{max}$ are the minimal and maximum real power output of the generator; $Q_G^{min}$ and $Q_G^{max}$ are minimal and maximum reactive power output of the generator.

Figure 21A:
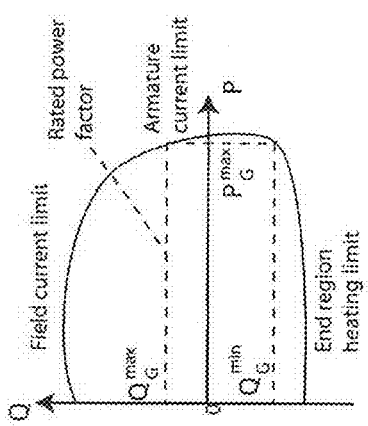
FIGS. 21a and 21b are generator limit diagrams, FIG. 21a depicting a five segment linearization of generator limit and FIG. 21b depicting a nine segment linearization of generator limit.

Note that more accuracy can be obtained if the generator output limit is approximated by larger number of linearized segments. FIG. 21a shows using five linear segments (A-B-C-D-E) to linearize generator output constraints. Mathematically, they can be represented as:

$$P_G \geq 0 \tag{88}$$

$$-\frac{y_B - y_A}{x_B} P_G + Q_G \leq y_A \tag{89}$$

$$P_G - \frac{x_B - x_C}{y_B} Q_G \leq x_C \tag{90}$$

$$P_G - \frac{x_D - x_C}{y_D} Q_G \leq x_C \tag{91}$$

$$-\frac{y_D - y_E}{x_D} P_G + Q_G \geq y_E \tag{92}$$

where $x_i$ and $y_i$ are values of P axis and Q axis value of point i (i=A, B, C, D or E). Eqns. (88)-(92) represent linear constraints AE, AB, BC, CD, DE respectively.

Figure 21B:
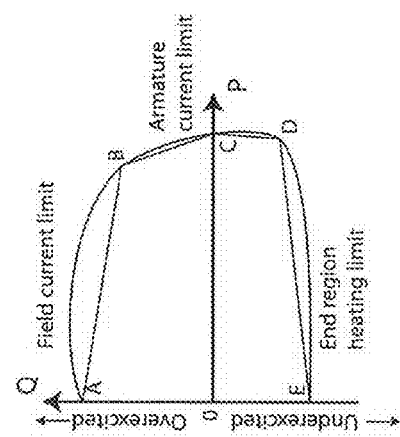

Nine-segment linearization shown in FIG. 21b can provide even more precise results; however, the number of constraints increased may introduce tremendous computational burden. It depends on individual case to determine how many segments are preferred to chose for the linearization. Normally, four or five segments are sufficient.

Applications

The disclosed linear programming framework may be used to solve the optimal power flow (OPF) problem and implemented as a computer-implemented tool for power control engineers to study and assess the reliability evaluation of composite system. The following formulates both problems and test results are provided thereafter.

Optimal Power Flow

The objective function used in this linear programming (LP)-based optimal power flow is to minimize the total generation cost. This objective function is subject to equality and inequality constraints. The minimization problem is formulated as, $$F = \min \sum_{i=1}^{N_g} F_i(P_{Gi}) \tag{93}$$

Subject to, $$B'\theta - GV + P_G - P_{loss} = P_D \tag{94}$$

$$G'\theta - BV + Q_G - Q_{loss} = Q_D \tag{95}$$

$$P_{loss}^k = -\frac{1}{2} \sum_{m \in \Omega_k} \sum_{i=1}^{L} G_{km} h(i) \Delta\theta_{km}(i) \tag{96}$$

$$Q_{loss}^k = \frac{1}{2} \sum_{m \in \Omega_k} \sum_{i=1}^{L} B_{km} h(i) \Delta\theta_{km}(i) \tag{97}$$

$$h(i) = (2i - 1)|\theta_{km}|_{max}/L \tag{98}$$

$$\theta_{km} - \theta_{km}^+ + \theta_{km}^- = 0 \tag{99}$$

$$\sum_{i=1}^{L} \Delta\theta_{km}(i) - \theta_{km}^+ - \theta_{km}^- = 0 \tag{100}$$

$$-S_{km}^{max} \leq P_{km}\cos\theta + Q_{km}\sin\theta \leq S_{km}^{max} \tag{101}$$

$$P_{km} = \frac{\theta_k - \theta_m}{X_{km}} \tag{102}$$

$$Q_{km} = -V_k \frac{B}{2} + \frac{V_k - V_m}{X_{km}} \tag{103}$$

$$P_G^{min} \leq P_G \leq P_G^{max} \tag{104}$$

$$Q_G^{min} \leq Q_G \leq Q_G^{max} \tag{105}$$

$$V^{min} \leq V \leq V^{max} \tag{106}$$

$$0 \leq \Delta\theta_{km}(i) \leq |\theta_{km}|_{max}/L \tag{107}$$

$$k, m \in \Omega_k, \theta_{km}^+, \theta_{km}^- \geq 0 \tag{108}$$

where, F is linearized generation cost function given in Section 2; $N_g$ is number of generators; Eqns. (94) and (95) describe power balance given in Section 3.1.2; Eqns. (96)-(100) present linear expressions of losses; $P_{loss}^k$ is the $k^{th}$ element of $P_{loss}$; $Q_{loss}^k$ is the $k^{th}$ element of $Q_{loss}$; h(j) is the slope coefficient of $j^{th}$ segment of loss equation; The artificial variables, created to linearize losses, $\Delta\theta_{km}(j)$, $\theta_{km}^+$ and $\theta_{km}^-$ are bounded by (107) and (108); Eqns. (101)-(103) indicate the linear constraints of transmission lines; It is expressed fully by (80)-(85); $S_{km}^{max}$ is maximum complex power limit of transmission line km; Constraints (104) and (105) are generator limits; The constraint (106) poses lower and upper limits for bus voltage magnitudes; $V^{max}$ is the vector of maximum allowable voltages; $V^{min}$ is the vector of minimum allowable voltages.

Reliability Evaluation

The Linear Programming is used here to minimize load curtailments similar to the formulation of the DC power flow model while incorporating voltage and reactive power constraints. In other words, it is used to perform Minimum Load Shedding, MLS, in case of a contingency. From the above constraints, the minimization problem can be formulated as, $$\text{Loss of Load} = \min\left(\sum_{i=1}^{N_b} P_{Ci}\right) \tag{109}$$

Subject to $$B'\theta - GV + P_G + P_C - P_{loss} = P_D \tag{110}$$

$$G'\theta + BV + Q_G + Q_C - Q_{loss} = Q_D \tag{111}$$

$$P_{loss}^k = -\frac{1}{2} \sum_{m \in \Omega_k} \sum_{i=1}^{L} G_{km} h(i) \Delta\theta_{km}(i) \tag{112}$$

$$Q_{loss}^k = -\frac{1}{2} \sum_{m \in \Omega_k} \sum_{i=1}^{L} B_{km} h(i) \Delta\theta_{km}(i) \tag{113}$$

$$h(i) = (2i - 1)|\theta_{km}|_{max}/L \tag{114}$$

$$\theta_{km} - \theta_{km}^+ + \theta_{km}^- = 0 \tag{115}$$

$$\sum_{i=1}^{L} \Delta\theta_{km}(i) - \theta_{km}^+ - \theta_{km}^- = 0 \tag{116}$$

$$-S_{km}^{max} \leq P_{km}\cos\theta + Q_{km}\sin\theta \leq S_{km}^{max} \tag{117}$$

$$P_{km} = \frac{\theta_k - \theta_m}{X_{km}} \tag{118}$$

$$Q_{km} = -V_k \frac{B}{2} + \frac{V_k - V_m}{X_{km}} \tag{119}$$

$$P_G^{min} \leq P_G \leq P_G^{max} \tag{120}$$

$$Q_G^{min} \leq Q_G \leq Q_G^{max} \tag{121}$$

-continued $$0 \le P_C \le P_D \quad (122)$$

$$0 \le Q_C \le Q_D \quad (123)$$

$$V^{min} \le V \le V^{max} \quad (124)$$

$$0 \le \Delta\theta_{km}(i) \le |\theta_{km}|_{max}/L \quad (125)$$

$$k, m \in \Omega_k, \theta_{km}^+, \theta_{km}^- \ge 0 \quad (126)$$

where, $P_{Ci}$ is the load curtailment at bus i; $P_C$ is the vector of real load curtailments ($N_b \times 1$); $Q_C$ is the vector of reactive load curtailments ($N_b \times 1$). The rest symbols are the same as those defined in Subsection 4.1. Eqns. (110) and (111) represent power balance constraints; Eqns. (112)-(116), (125) and (126) model transmission line losses; Eqns. (117)-(119) are constraints of transmission line flows; Generator constraints are modeled as (120) and (121); Eqns. (122) and (123) poses real and reactive power curtailment constraints; Bus voltage magnitude constraints are expressed as (124).

Transmission Expansion Planning

Transmission expansion planning can be modeled as a mixed-integer LP problem. The disclosed enhanced linear optimal power flow (ELOPF) can be an alternative candidate to replace DC model for transmission expansion problems. Its objective function is:

$$\text{Min} \sum_{k,m \in \Omega_k} C_{km} x_{km} + \sum_{t=1}^{T_p} \sum_{i=1}^{N_g} F_i(P_{Gi}^t) \quad (127)$$

Subject to $$B'\theta^t - GV^t + P_G^t - P_{loss}^t = P_D^t \quad (128)$$

$$G'\theta^t - BV^t + Q_G^t - Q_{loss}^t = Q_D^t \quad (129)$$

$$P_{loss}^{kt} = -\frac{1}{2} \sum_{m \in \Omega_k} \sum_{i=1}^{L} G_{km} h^t(i) \Delta\theta_{km}^t(i) \quad (130)$$

$$Q_{loss}^{kt} = \frac{1}{2} \sum_{m \in \Omega_k} \sum_{i=1}^{L} B_{km} h^t(i) \Delta\theta_{km}^t(i) \quad (131)$$

$$h^t(i) = (2i-1)|\theta_{km}|_{max}/L \quad (132)$$

$$\theta_{km}^t - \theta_{km}^{t+} + \theta_{km}^{t-} = 0 \quad (133)$$

$$\sum_{i=1}^{L} \Delta\theta_{km}^t(i) - \theta_{km}^{t+} - \theta_{km}^{t-} = 0 \quad (134)$$

$$-S_{km}^{max} x_{km} \le P_{km}^t \cos\theta + Q_{km}^t \sin\theta \le S_{km}^{max} x_{km} \quad (135)$$

$$P_{km}^t = \frac{\theta_k^t - \theta_m^t}{X_{km}} \quad (136)$$

$$Q_{km}^t = -V_k^t \frac{B}{2} + \frac{V_k^t - V_m^t}{X_{km}} \quad (137)$$

$$P_G^{min} \le P_G^t \le P_G^{max} \quad (138)$$

$$Q_G^{min} \le Q_G^t \le Q_G^{max} \quad (139)$$

$$V^{min} \le V^t \le V^{max} \quad (140)$$

$$0 \le \Delta\theta_{km}^t(i) \le |\theta_{km}|_{max}/L \quad (141)$$

$$k, m \in \Omega_k, \theta_{km}^{t+}, \theta_{km}^{t-} \ge 0 \quad (142)$$

where $C_{km}$ is the cost of building line between node k and node m; $x_{km}$ is a binary variable; When the line between node k and node m is built, $x_{km}=1$; otherwise $x_{km}=0$. $T_p$ is the operating time; $N_g$ is the number of generators; $F_i$ is the generation cost of generator i; $P_{Gi}^t$ is the real power generation of generator i at time t; $V^t$ and $\theta^t$ are bus voltage magnitude and angle vectors at time t; and Qt, are generation real and reactive power output vectors at time t; $P_{loss}^t$ and $Q_{loss}^t$ are real and reactive power losses at time t; $P_D^t$ and $Q_D^t$ are real and reactive load at time t; $P_{loss}^{kt}$ and $Q_{loss}^{Kt}$ are $k^{th}$ element of $P_{loss}^t$ and $Q_{loss}^t$; $h^t(j)$ is the slope coefficient of $j^{th}$ segment of loss equation at time t; $\theta_{km}^{t+}, \theta_{km}^{t-}$ and $\Delta\theta_{km}^{t+}(j)$ are artificial variables for loss linearization.

System Implementation

Figure 24:
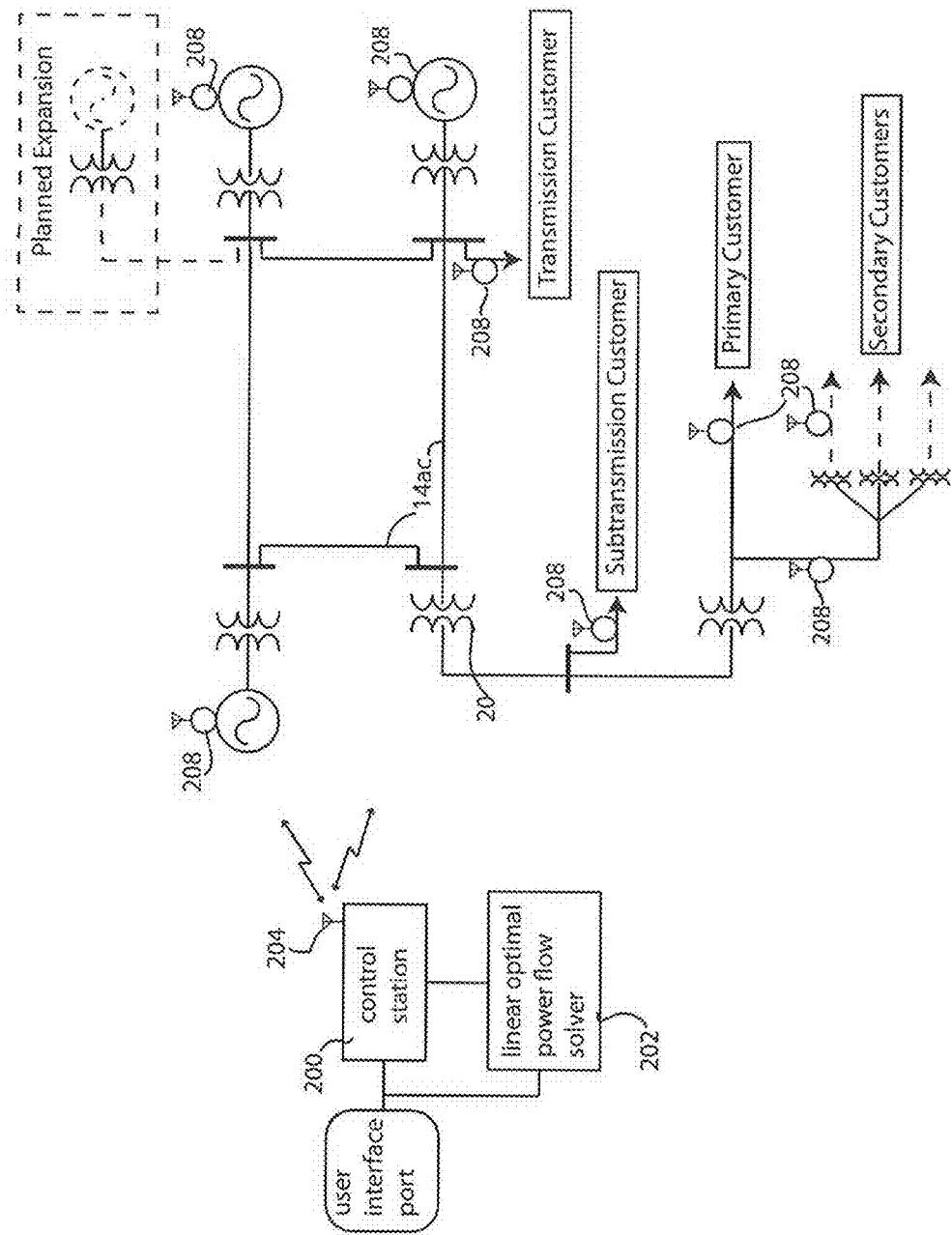
FIG. 24 is a schematic diagram showing an exemplary portion of a power grid, with generation sources and nodes being controlled by a control station equipped with linear optimal power flow solver.

In use the linear optimal power flow solver disclosed herein in its various different embodiments may be used to control the generation sources and loads within a power grid as has been diagrammatically illustrated in FIG. 24. In FIG. 24 a control station 200 communicates with the linear optimal power flow solver 202 to allow the control station 200 to collect data from and send control instructions to the generation sources and loads by radio control (as at 204). To facilitate this remote control the generation sources and loads are outfitted with wireless power controllers 208 that operate to switch generation sources and loads on and off remotely, and also optionally gather and communicate back to the control station 200 voltage, current, power generation/consumption, power factor and other ambient measurement data (e.g. temperature) from the respective generation sources and loads.

The linear optimal power flow solver 202 is computer-implemented, as described in connection with FIGS. 11-14. The computer implementation can be implemented as part of the control station 200, i.e., using computer(s) that are physically located at the control station; alternatively, the computer implementation of the linear optimal power flow solver can be remotely located and placed in communication with the control station via a networked connection, such as an Internet connection.

Using the linear optimal power flow solver 202 as described above, the power grid is modeled and evaluated. Optimal power flow conditions are calculated, as described above, and the control station 200 then issues control commands to the power grid to add or shed load, or to engage or disengage generation sources so that the optimal power flow is achieved. For example, the optimal power flow conditions may be established by the control station operator to minimize total generation cost. In such case the control station 200, using the linear optimal power flow solver 202 automatically controls the power controllers 208, to automatically control the power grid so control the overall power grid's operating point towards the minimum total cost generation goal.

In an alternate use, the control station 200 can be used to evaluate a planned expansion, such as the addition of another generation station (illustrated in dashed lines in FIG. 24) or the addition of additional loads. In this case the linear optimal power flow solver 202 is configured to optimize power flow to minimize the cost of the planned expansion. For example, several different proposed expansions can be individually assessed, based on the performance of the existing power grid and the best (e.g., lowest expansion cost) is determined. Because the control station 200 is in communication with the existing generation sources and loads (via the power controllers 208), actual real-time data can be gathered and used in the linear optimal power flow computations, thereby making the expansion planning and cost estimates thereof more accurate.

Optimal Power Flow—Examples and Test Results

In order to demonstrate the effectiveness of the proposed linear programming based optimal power flow framework, it was tested on the IEEE RTS, 30 bus, IEEE 14, IEEE 30, IEEE 57, IEEE 118, IEEE 300 systems. Test results, assumptions, discussions, and some recommendations for future work are also provided in this section.

The IEEE RTS Test Case

The proposed ELOPF and LC-ELOPF have been tested on the IEEE RTS system whose data are given in "Reliability Test System Task Force of the Application of Probability Methods Subcommittee," IEEE Trans. on Power App. and Syst., vol. PAS-98, No. 6, pp. 2047-2054, November/December 1979. This system consists of 24 buses, 35 transmission lines, 5 transformers, and 32 generating units placed on 10 buses. The IEEE RTS also has one reactor and one synchronous condenser. Total generation capacity of this system is 3405 MW. Whereas, total real and reactive peak loads respectively are 2850 MW and 580 MVar.

Figure 22:
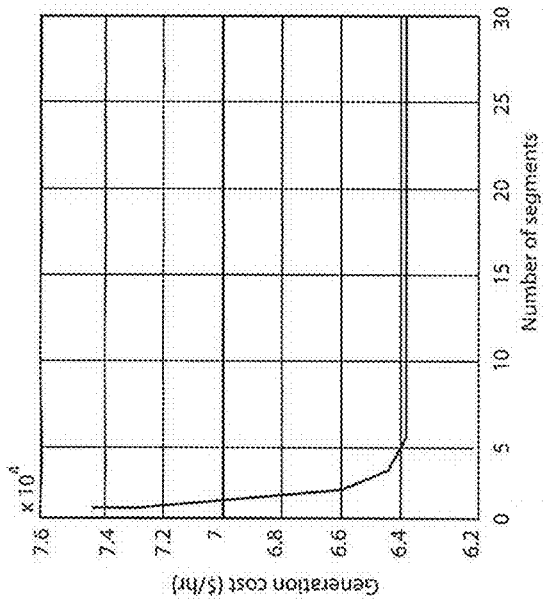
FIG. 22 is a graphical depcition of generation cost ($/hr) versus number of loss segments.
Figure 23:
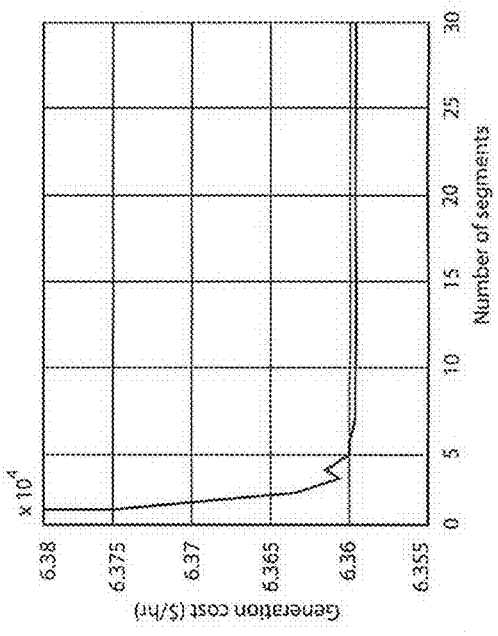
FIG. 23 is a graphical depiction of genderation cost ($/hr) versus number of generation cost segments.

Simulation results of total generation, total losses, total generation cost and cost errors are given in Table I. As can be clearly seen from Table I, the results obtained by LC-ELOPF are very close to those obtained by the ACOPF. ELOPF and DCOPF do not consider the losses from the series impedance of transmission lines. Hence, they obtain zero losses as shown in the table. The errors of objective function values of LC-ELOPF, ELOPF and DCOPF are 0.7%, 4.45%, 4.45% respectively. The reason that ELOPF and DCOPF obtain the same generation cost is that both of these methods do not consider losses. Since they have the same amount of load, they generate the same amount of power. When the constraints from transmission lines are loose, they obtain the same generation cost. FIG. 22 and FIG. 23 show the curve of generation cost for different number of segments of loss or generation. If we stress the constraints of transmission lines by multiplying the load and generation by a factor of 1.6 and 2 respectively. Seen from Table II, in the context of tight transmission constraints, ELOPF can obtain better solution than DCOPF.

TABLE 4

Total Cost, Total Generation, and Total Losses of the IEEE RTS Obtained Using Different Power Flow Models

| Item and Method | ACOPF | LC-ELOPF | ELOPF | DCOPF |
| --- | --- | --- | --- | --- |
| Tot. Gen. (MW) | 2896.77 | 2901.27 | 2850.00 | 2850.00 |
| Tot. Losses (MW) | 46.77 | 51.27 | 0.00 | 0.00 |
| Cost ($/hr) | 63352.21 | 63591.47 | 61001.37 | 61001.37 |
| Cost Errors (%) | 0 | 0.38 | 3.71 | 3.71 |

TABLE 5

Total Cost, Total Generation, and Total Losses of the IEEE RTS With Load and Generation Multiplied by 1.6 and 2

| Item and Method | ACOPF | LC-ELOPF | ELOPF | DCOPF |
| --- | --- | --- | --- | --- |
| Tot. Gen. (MW) | 4702.28 | 4720.11 | 4560.00 | 4560.00 |
| Tot. Losses (MW) | 142.28 | 160.11 | 0.00 | 0.00 |
| Cost ($\times 10^4$ $/hr) | 10.19 | 10.18 | 9.91 | 9.37 |
| Cost Errors (%) | 0 | 0.10 | 2.78 | 8.07 |

The IEEE MRTS Test Case

In the original IEEE RTS system, the transmission lines are strong in comparison with the generation system, and consequently little transmission congestions are encountered. Hence, it was suggested that the system be modified by multiplying the generation by a factor of 2 and the loads by a factor of 1.8 while keeping the transmission capacities the same. This modified RTS, sometimes referred to as Modified IEEE RTS (IEEE MRTS) is widely used in reliability study. However, ACOPF model of MRTS can not converge. In order to compare the results between DCOPF, ELOPF, LC-ELOPF and ACOPF, we modify MRTS by replacing the shunt inductor of 2 p.u. at bus 6 by a variable reactive load consuming reactive power from 0 to 2 p.u., and installing a capacitor of 0.3 p.u. at bus 3. Simulation results are compared in Table 6.

TABLE 6

Total Cost, Total Generation, and Total Losses of IEEE MRTS

| Item and Method | ACOPF | LC-ELOPF | ELOPF | DCOPF |
| --- | --- | --- | --- | --- |
| Tot. Gen. (MW) | 5273.25 | 5319.42 | 5130.00 | 5130.00 |
| Tot. Losses (MW) | 143.25 | 189.42 | 0.00 | 0.00 |
| Cost ($\times 10^B$ $/hr) | 1.346 | 1.301 | 1.176 | 1.176 |
| Cost Errors (%) | 0 | 3.34 | 12.60 | 12.60 |

The 30 Bus System Test Case

The proposed ELOPF and LC-ELOPF methods have also been implemented on the 30 bus system. This system has six generating units placed at buses 1, 2, 13, 22, 23, and 27, respectively.

In this case, four different methods, DCOPF, ELOPF, LC-ELOPF and FACOPF are tested. Total generation, total losses, total cost and cost errors are presented and compared in Table IV. As can be clearly seen from this table, LC-ELOPF can obtain better objective function value than DCOPF. The difference of generation cost between FACOPF and LC-ELOPF is only 0.19%. However, LC-ELOPF can obtain the results in only one iteration with superior speed advantage than ACOPF. The tested 30 bus system has strong transmission system. Therefore, the constraints from transmission lines are so loose that DCOPF and ELOPF obtain the same objective values. Both DCOPF and ELOPF models obtain zeros losses shown in the table, since they do not consider losses from the series part of transmission lines.

TABLE 7

Total Cost, Total Generation, and Total Losses of the 30 Bus System Obtained Using Different Power Flow Models

| Item and Method | ACOPF | LC-ELOPF | ELOPF | DCOPF |
| --- | --- | --- | --- | --- |
| Tot. Gen. (MW) | 192.06 | 191.94 | 189.2 | 189.2 |
| Tot. Losses (MW) | 2.86 | 2.74 | 0 | 0 |
| Cost ($/hr) | 576.89 | 575.77 | 565.21 | 565.21 |
| Cost Errors (%) | 0 | 0.19 | 2.07 | 2.07 |

Benchmarking of ELOPF and LC-ELOPF

The proposed ELOPF and LC-ELOPF methods have also been extensively tested on the IEEE 14, IEEE 30, IEEE 57, TEEF, 118 and IEEE 300 systems. The objective function is to reduce total generation cost. The results of DCOPF and ACOPF are obtained from R. D. Zimmerman and C. Murillo-Sanchez, MATPOWERUser's Manual [Online]. Available at: http://www.pserc.cornell.edu//matpower/. Simulation results are displayed in Table 8. It can been seen that for these studied systems, DCOPF and ELOPF achieve the same objective function values. It is due to the fact that the constraints of transmission lines and bus voltages are very loose in these studied systems. Since both of these methods are lossless, they obtain the same objective values. However, LC-ELOPF model can achieve better objective function values by considering losses. The speed of ELOPF and LC-ELOPF, although not as fast as DCOPF, is significantly faster than ACOPF and is applicable for repetitive optimization.

TABLE 8

Optimal Power Flow Results of IEEE 14 Bus, 30 Bus, 57 Bus, 118 Bus and 300 Bus UsingDifferent Power Flow Models

| Tested System | Cost & % Error | DCOPF | ELOPF | LC-ELOPF | FAC OPF |
|---|---|---|---|---|---|
| IEEE, 14 bus | Cost* | 7.64 | 7.64 | 8.079 | 8.08 |
| | Error (%) | 5.42 | 5.42 | 0.01 | 0.00 |
| IEEE, 30 bus | Cost* | 8.34 | 8.34 | 8.909 | 8.91 |
| | Error (%) | 6.32 | 6.32 | 0.01 | 0.00 |
| IEEE, 57 bus | Cost** | 4.10 | 4.10 | 4.171 | 4.17 |
| | Error (%) | 1.77 | 1.77 | 0.02 | 0.00 |
| IEEE, 118 bus | Cost*** | 1.26 | 1.26 | 1.302 | 1.30 |
| | Error (%) | 3.08 | 3.08 | 0.15 | 0.00 |
| IEEE, 300 bus | Cost*** | 7.06 | 7.06 | 7.210 | 7.20 |
| | Error (%) | 1.88 | 1.88 | 0.14 | 0.00 |

*= Cost ($\times 10^3$ \$/hr);
**= Cost ($\times 10^4$ \$/hr);
***= Cost ($\times 10^B$ \$/hr)

Composite System Reliability Evaluation

The application of the disclosed linear programming for composite system reliability assessment is carried out in this section. Four different systems, including practical systems, have been used. The proposed models were tested on a small scale 6 bus system, the IEEE RTS, IEEE MRTS system and the SPC 45 bus system, which represents a portion of the Saskatchewan Power Corporation in Canada. For details of this test system see R. Billinton and S. Kumar, "Effect of higher-level independent generator outages in composition-system adequacy evaluation," IEE Proceedings on Generation, Transmission and distribution, Vol. 134, No. 1, pp. 17-26, January 1987. Test results, assumptions, and discussion, are also provided in this section.

In this work we have evaluated four reliability indices, namely: LOLP, EDNS, LOEE, LOLE. The definitions of these indices are:

A Loss of Load (LOL) event is one in which a system is unable to meet its total demand.

Loss of Load Probability (LOLP) is the probability of encountering one or more LOL events during a given time period. Expected Demand Not Served (EDNS) is the expected (average) demand that the system is unable to serve as a result of LOL events during a given period. It is calculated as the weighted sum of the demands curtailed during the LOL events, the weights being the probabilities of the corresponding LOL events. It is expressed in MW/year or GW/year.

Loss of Energy Expectation (LOEE) is the expected (average) energy that the system is unable to serve as a result of LOL events during a given period. It is calculated as the weighted sum of the energies curtailed during the LOL events, the weights being the probabilities of the corresponding LOL events. It is expressed in MWh/year or GWh/year.

Loss of Load Expectation (LOEE) is the expected (average) of encountering one or more LOL events during a given time period. It is expressed in hr/year.

Calculation of Reliability Indices

The calculation of reliability indices using linearized load flow not only considers the effect of generation capacity limit and transmission power carrying capabilities, but also it considers the effect of the voltage and reactive power limits. If the system is assumed to have unlimited reactive power and there is no voltage limits, reliability indices more likely will not change from the values calculated using the DC load flow. However, this is not usually the case. For instance, systems with limited reactive power support, reliability indices are expected to increase accordingly.

Modeling of Available Generation

Buses may have several generators which can have similar or different capacities and/or reliability parameters. The Unit Addition Algorithm (see C. Singh and Q. Chen, "Generation System Reliability Evaluation Using a Cluster Based Load Model," IEEE Trans. on Power Systems, vol. 4, No. 1, pp. 102-107, February 1989) is used to construct a discrete probability distribution function for each bus which is known as Capacity Outage Probability And Frequency Table, COPAFT. This table is constructed based on the capacity states and forced outage rates of units at each bus.

Modeling of System Loads

Loads at the buses are modeled based on the cluster load model technique. From the chronological loads, clusters are constructed according to the load level and its probability. These clusters are used for each load bus as a percentage of the peak load of the given bus.

Modeling of Transmission Lines

A discrete probability density function is constructed for every transmission line. If a line is tripped for some system state, the line is removed from the bus admittance matrix and its capacity is set to zero.

Dynamic Bus Numbering

In the composite system reliability evaluation, there can be multi-optimum situations. Depending on the manner in which the program scans the vertices of the feasible polytope, it can favor curtailing power at certain buses depending on how the buses are numbered. This bias can be removed by dynamic numbering of the buses, i.e., altering the bus numbers after the occurrence of each event in the simulation. In the literature, load priority philosophy technique is usually used to overcome this problem. However, if the amount of load curtailment at each bus is less than the load priority level, the multi-optimum problem will occur.

Case Studies

The proposed formulation was applied on three different systems—IEEE RTS, IEEE MRTS and SPC (Saskatchewan Power System). The reason behind chosen such systems can be attributed, in part, to the fact that these systems have different loading levels, various line capacities, and different reactive power limits. For instance, the available capacity margin of the IEEE RTS is less than that of the SPC which is expected to make it more stressed than the SPC system. The annualized indices of the IEEE RTS at the mean load are zeros whereas for the SPC mean loads causes some load curtailments. The MRTS is stressed version of the IEEE RTS system. The term annualized is used here to describe a case where system loads are fixed at some value. In this work, annualized indices are evaluated at the peak load.

Since reliability evaluation of composite power systems using AC or linearized power flow models accounts for voltage and reactive power violations, the major concern of solving linear programming optimization problem is over voltage violation. In such analysis, the objective function of the linear programming problem is the minimization of the sum of the load curtailments. Therefore, under voltage violations can be alleviated by load shedding. However, it is impossible to alleviate over voltage violations by performing load shedding and the linear programming optimization problem will not find a feasible solution. Such scenarios should be studied separately with the focus of installing reactive power support—in this case reactors. It should be mentioned here that in the four systems presented in this paper and, in some known other systems, this situation did not occur but it is worthwhile to point out such a problem for future work.

IEEE RTS System

This system has been extensively tested for power system reliability analysis. System data are given in Reliability Test System Task Force of the Application of Probability Methods Subcommittee, "IEEE Reliability Test System," IEEE Trans. on Power App. and Syst., Vol. PAS-98, No. 6, pp. 2047-2054, November/December, 1979. The IEEE RTS consists of 24 buses, 38 transmission lines/transformers and 32 generating units on 10 buses. It has one reactor and one synchronous condenser. The total generation of this system is 3405 MW and total peak load is 2850 MW and 580 MVar. The voltage limits are assumed to be between 1.05 p.u. and 0.95 p.u. Other details have been mentioned earlier in the OPF part.

The SPC System

The SPC system is the network of the Saskatchewan Power Corporation in Canada. The system consists of 45 buses, 29 generating units on 8 buses and 71 transmission lines/transformers. Four of the 45 buses are used to represent equivalent assistance from the Manitoba Hydro System. One of these four buses is a fictitious bus that represents the power import from Manitoba Hydro System which is 300 MW. This bus is connected to the other three buses and the sum of the 300 MW is represented by three generating units each of which 100 MW. The total generation is 2530 MW and total load is 1802.5 MW and 376.4 MVar. The voltage limits are assumed to be between 1.05 p.u. and 0.95 p.u. System data are given in R. Billinton and S. Kumar, "Effect of higher-level independent generator outages in composite-system adequacy evaluation," IEEE Proceedings on Generation, Transmission and Distribution, Vol. 134, No. 1, pp. 17-26, January 1987.

Test Results

The model was applied on the previously mentioned systems and the results were verified by testing the algorithm on a special case which is the DC load flow model. As a process of verifying the results, the resistances of the lines were changed to zeros, voltage magnitudes were set to 1.0 p.u. and reactive power constraints were relaxed to large values. The results of the modified system data gave the same results as of the use of the DC load flow model. Analyses of the annual as well as the annualized indices were conducted on the four systems and compared with the results of using DC load flow model.

Tables 9 and 12 show the annual and annualized indices of the IEEE RTS system respectively. The annualized indices were evaluated at the annual peak load. From these Tables, it is clear that the indices of the linearized load flow model are slightly larger than the indices of the DC load flow model. These differences in the results can be attributed to the voltage and reactive power limit violations. For instance,

TABLE 9

Annual Indices of the IEEE RTS System

| Power Flow Model | LOLP | EDNS MW | LOEE MWh/yr | LOLE hr/yr |
| --- | --- | --- | --- | --- |
| LC-ELOPF | 0.00167 | 0.18827 | 1644.76201 | 14.54544 |
| ELOPF | 0.00166 | 0.15027 | 1312.74740 | 14.53327 |
| DCOPF | 0.00124 | 0.14593 | 1274.88792 | 10.78896 | in some loading scenarios, comparatively large reactive powers were flowing in some lines which cause under voltage violations. Tables 10 and 13 display bus annual and annualized indices of the IEEE RTS system using ELOPF model. Tables 11 and 14 display bus annual and annualized indices of the IEEE RTS system using LC-ELOPF.

Tables 15 and 18 show the annual and annualized indices of IEEE MRTS. It can be seen that the differences of the indices between DC load flow and linearized AC load flow of MRTS system are larger than those of RTS system. The reason can be explained that in MRTS, the amounts of line flows are more significant than those in RTS. Therefore, the effects of the constraints of transmission lines in MRTS are more influential than those in RTS. Since the linearized AC load flow uses more segments to linearize constraints of transmission lines than DC load flow, it obtains more accurate results. In Table 18, the indices of DC load flow is greater than those of linearized AC load flow. The reason is because in MRTS system, the network is heavily loaded, the assumption of DC load flow that the voltage is around 1.0 brings in significant errors. Tables 16 and 19 show bus annual and annualized indices of the MRTS system respectively using ELOPF model. Tables 17 and 20 show bus annual and annualized indices of the MRTS system respectively using LC-ELOPF model.

TABLE 10

Bus Annual Indices of the IEEE RTS System Using ELOPF Model

| Bus No. | LOLP | EDNS MW | LOEE MWh/yr | LOLE hr/yr |
| --- | --- | --- | --- | --- |
| 1 | 0.000329 | 0.006757 | 65.78458 | 2.874144 |
| 2 | 0.000326 | 0.006172 | 60.09063 | 2.847936 |
| 3 | 0.000338 | 0.013584 | 132.2508 | 2.952768 |
| 4 | 0.000328 | 0.006249 | 60.83763 | 2.865408 |
| 5 | 0.000335 | 0.006197 | 60.33815 | 2.926560 |
| 6 | 0.000354 | 0.008129 | 79.13979 | 3.092544 |
| 7 | 0.000069 | 0.000926 | 9.016522 | 0.602784 |
| 8 | 0.000321 | 0.005381 | 52.38687 | 2.804256 |
| 9 | 0.000301 | 0.008233 | 80.15933 | 2.629536 |
| 10 | 0.000322 | 0.008559 | 83.32821 | 2.812992 |
| 13 | 0.000342 | 0.013734 | 133.7173 | 2.987712 |
| 14 | 0.000303 | 0.009052 | 88.13289 | 2.647008 |
| 15 | 0.000342 | 0.016223 | 157.9435 | 2.987712 |
| 16 | 0.000298 | 0.006328 | 61.60945 | 2.603328 |
| 18 | 0.000329 | 0.015889 | 154.6918 | 2.874144 |
| 19 | 0.000321 | 0.011962 | 116.4601 | 2.804256 |
| 20 | 0.000315 | 0.006896 | 67.14084 | 2.751840 |

TABLE 11

Bus Annual Indices of the IEEE RTS System Using LC-ELOPF Model

| Bus No. | LOLP | EDNS MW | LOEE MWh/yr | LOLE hr/yr |
| --- | --- | --- | --- | --- |
| 1 | 0.000006 | 0.000017 | 0.148512 | 0.052416 |
| 2 | 0.000005 | 0.000009 | 0.078624 | 0.043680 |
| 3 | 0.001119 | 0.043011 | 375.7432 | 9.772373 |

TABLE 11-continued

Bus Annual Indices of the IEEE RTS System Using LC-ELOPF Model

| Bus No. | LOLP | EDNS MW | LOEE MWh/yr | LOLE hr/yr |
|---|---|---|---|---|
| 4 | 0.000387 | 0.005049 | 44.10917 | 3.382744 |
| 5 | 0.000301 | 0.002277 | 19.89530 | 2.631023 |
| 6 | 0.001549 | 0.077126 | 673.7706 | 13.53098 |
| 7 | 0.000029 | 0.000705 | 6.159988 | 0.250574 |
| 8 | 0.000387 | 0.011797 | 103.0545 | 3.382744 |
| 9 | 0.000072 | 0.002096 | 18.30753 | 0.626434 |
| 10 | 0.000158 | 0.006671 | 58.28068 | 1.378155 |
| 13 | 0.000008 | 0.000021 | 0.183456 | 0.069888 |
| 14 | 0.000445 | 0.014244 | 124.4397 | 3.883892 |
| 15 | 0.000115 | 0.007830 | 68.40072 | 1.002295 |
| 16 | 0.000010 | 0.000024 | 0.209664 | 0.087360 |
| 18 | 0.000473 | 0.016287 | 142.2840 | 4.134465 |
| 19 | 0.000029 | 0.001075 | 9.388063 | 0.250574 |
| 20 | 0.000006 | 0.000035 | 0.305760 | 0.052416 |

TABLE 12

Annualized Indices of the IEEE RTS System

| Power Flow Model | LOLP | EDNS MW | LOEE MWh/yr | LOLE hr/yr |
|---|---|---|---|---|
| LC-ELOPF | 0.11039 | 17.99510 | 157205.17350 | 964.3327 |
| ELOPF | 0.08533 | 14.59466 | 127498.94980 | 745.4720 |
| DC | 0.08344 | 14.40468 | 125839.24080 | 728.9464 |

TABLE 13

Bus Annualized Indices of the IEEE RTS System Using ELOPF Model

| Bus No. | LOLP | EDNS MW | LOEE MWh/yr | LOLE hr/yr |
|---|---|---|---|---|
| 1 | 0.02343 | 0.610543394 | 5333.70709 | 204.68448 |
| 2 | 0.02318 | 0.535565579 | 4678.700897 | 202.50048 |
| 3 | 0.02446 | 1.147338311 | 10023.14749 | 213.68256 |
| 4 | 0.02355 | 0.622805115 | 5440.825483 | 205.7328 |
| 5 | 0.02385 | 0.591821253 | 5170.150464 | 208.3536 |
| 6 | 0.02447 | 0.947216714 | 8274.88521 | 213.76992 |
| 7 | 0.02337 | 0.118444511 | 1034.731249 | 204.16032 |
| 8 | 0.02347 | 0.919114791 | 8029.386818 | 205.03392 |
| 9 | 0.02477 | 0.987288914 | 8624.955956 | 216.39072 |
| 10 | 0.02372 | 0.976419885 | 8530.00412 | 207.21792 |
| 13 | 0.02319 | 1.089944222 | 9513.016719 | 202.58784 |
| 14 | 0.02329 | 0.94536408 | 8258.7006 | 203.46144 |
| 15 | 0.0238 | 1.440025355 | 12580.0615 | 207.9168 |
| 16 | 0.02419 | 0.603631654 | 5273.326128 | 211.32384 |
| 18 | 0.02359 | 1.36674931 | 11939.92797 | 206.08224 |
| 19 | 0.02396 | 1.03833674 | 9070.90976 | 209.31456 |
| 20 | 0.0236 | 0.655052613 | 5722.53962 | 206.6064 |

TABLE 14

Bus Annualized Indices of the IEEE RTS System Using LC-ELOPF Model

| Bus No. | LOLP | EDNS MW | LOEE MWh/yr | LOLE hr/yr |
|---|---|---|---|---|
| 1 | 0.000057 | 0.000815 | 7.11672 | 0.50115 |
| 2 | 0.000043 | 0.000755 | 6.59545 | 0.37586 |
| 3 | 0.066257 | 3.081525 | 26920.20665 | 578.82515 |
| 4 | 0.044917 | 1.046605 | 9143.14138 | 392.39835 |
| 5 | 0.070961 | 0.941673 | 8226.45392 | 619.91923 |
| 6 | 0.104162 | 7.301102 | 63782.42908 | 909.95824 |
| 7 | 0.001520 | 0.045846 | 400.51482 | 13.28040 |
| 8 | 0.021354 | 1.195055 | 10439.99811 | 186.55209 |
| 9 | 0.008920 | 0.302044 | 2638.65675 | 77.92841 |

TABLE 14-continued

Bus Annualized Indices of the IEEE RTS System Using LC-ELOPF Model

| Bus No. | LOLP | EDNS MW | LOEE MWh/yr | LOLE hr/yr |
|---|---|---|---|---|
| 10 | 0.014040 | 0.634929 | 5546.73538 | 122.65581 |
| 13 | 0.000086 | 0.004906 | 42.85692 | 0.75172 |
| 14 | 0.030848 | 1.575062 | 13759.74577 | 269.49197 |
| 15 | 0.005263 | 0.392814 | 3431.62470 | 45.98027 |
| 16 | 0.000089 | 0.001775 | 15.50240 | 0.25057 |
| 18 | 0.013782 | 1.388484 | 12129.80028 | 120.40064 |
| 19 | 0.001578 | 0.079805 | 697.17686 | 13.78155 |
| 20 | 0.000043 | 0.001902 | 16.61829 | 0.37586 |

TABLE 15

Annual Indices of the IEEE MRTS System

| Power Flow Model | LOLP | EDNS MW | LOEE MWh/yr | LOLE hr/yr |
|---|---|---|---|---|
| LC-ELOPF | 0.00247 | 0.16192 | 1414.5510 | 21.58097 |
| ELOPF | 0.00206 | 0.13058 | 1140.7533 | 17.99616 |
| DCOPF | 0.00105 | 0.07436 | 649.61330 | 9.17280 |

TABLE 16

Bus Annual Indices of the IEEE RTS System Using ELOPF Model

| Bus No. | LOLP | EDNS MW | LOEE MWh/yr | LOLE hr/yr |
|---|---|---|---|---|
| 3 | 0.00054 | 0.012726 | 111.17824 | 4.71744 |
| 5 | 0.00025 | 0.021979 | 192.00740 | 2.18400 |
| 6 | 0.00105 | 0.044969 | 392.84732 | 9.17280 |
| 7 | 0.00005 | 0.007651 | 66.83615 | 0.52416 |
| 8 | 0.00038 | 0.015463 | 135.08426 | 3.31968 |
| 14 | 0.00007 | 0.009011 | 78.72406 | 0.61152 |
| 16 | 0.00016 | 0.018782 | 164.07588 | 1.39776 |

TABLE 17

Bus Annual Indices of the IEEE MRTS System Using LC-ELOPF Model

| Bus No. | LOLP | EDNS MW | LOEE MWh/yr | LOLE hr/yr |
|---|---|---|---|---|
| 1 | 0.000003 | 0.000031 | 0.270816 | 0.026208 |
| 2 | 0.000008 | 0.000014 | 0.122304 | 0.069888 |
| 3 | 0.001025 | 0.056731 | 495.601964 | 8.951197 |
| 4 | 0.000070 | 0.000764 | 6.677700 | 0.613096 |
| 5 | 0.000014 | 0.000176 | 1.535270 | 0.122619 |
| 6 | 0.001207 | 0.044088 | 385.154346 | 10.545245 |
| 7 | 0.000112 | 0.006076 | 53.078001 | 0.980953 |
| 8 | 0.000632 | 0.036956 | 322.850720 | 5.517861 |
| 9 | 0.000006 | 0.000046 | 0.401856 | 0.052416 |
| 10 | 0.000014 | 0.001004 | 8.767398 | 0.122619 |
| 13 | 0.000011 | 0.001290 | 11.265083 | 0.096096 |
| 14 | 0.000154 | 0.007989 | 69.792684 | 1.348810 |
| 15 | 0.000014 | 0.000243 | 2.121788 | 0.122619 |
| 16 | 0.000028 | 0.002151 | 18.788256 | 0.245238 |
| 18 | 0.000056 | 0.001284 | 11.221251 | 0.490477 |
| 19 | 0.000042 | 0.003042 | 26.578584 | 0.367857 |
| 20 | 0.000004 | 0.000037 | 0.323232 | 0.034944 |

TABLE 18

Annualized indices of the IEEE MRTS system

| Power Flow Model | LOLP | EDNS MW | LOEE MWh/yr | LOLE hr/yr |
|---|---|---|---|---|
| LC-ELOPF | 0.11131 | 17.36012 | 151658.006 | 972.370 |
| ELOPF | 0.07131 | 10.11308 | 88347.840 | 622.991 |
| DCOPF | 0.07017 | 10.44237 | 91224.549 | 613.005 |

TABLE 19

Bus Annual Indices of the IEEE RTS System Using ELOPF Model

| Bus No. | LOLP | EDNS MW | LOEE MWh/yr | LOLE hr/yr |
|---|---|---|---|---|
| 2 | 0.000009 | 0.000035 | 0.30771 | 0.07597 |
| 3 | 0.002417 | 0.258314 | 2256.63238 | 21.11833 |
| 4 | 0.000487 | 0.014277 | 124.72503 | 4.25405 |
| 5 | 0.031626 | 2.397444 | 20944.07032 | 276.28550 |
| 6 | 0.007687 | 0.300220 | 2622.72271 | 67.15325 |
| 7 | 0.004939 | 0.057523 | 502.51814 | 43.14824 |
| 8 | 0.014948 | 0.092824 | 810.91128 | 130.58421 |
| 9 | 0.000096 | 0.017229 | 150.50847 | 0.83562 |
| 10 | 0.002130 | 0.106005 | 926.06369 | 18.61148 |
| 13 | 0.000017 | 0.002187 | 19.10490 | 0.15193 |
| 14 | 0.030530 | 3.697600 | 32302.23476 | 266.71388 |
| 15 | 0.002252 | 0.483335 | 4222.41804 | 19.67499 |
| 16 | 0.022565 | 2.458458 | 21477.08601 | 197.12974 |
| 18 | 0.000035 | 0.000411 | 3.58662 | 0.30386 |
| 19 | 0.002009 | 0.196618 | 1717.65143 | 17.54797 |
| 20 | 0.000374 | 0.030597 | 267.29879 | 3.26650 |

TABLE 20

Bus Annualized Indices of the IEEE MRTS System Using LC-ELOPF Model

| Bus No. | LOLP | EDNS MW | LOEE MWh/yr | LOLE hr/yr |
|---|---|---|---|---|
| 1 | 0.000070 | 0.003077 | 26.88019 | 0.613096 |
| 2 | 0.000197 | 0.004553 | 39.77753 | 1.716668 |
| 3 | 0.045645 | 3.136104 | 27397.00799 | 398.757415 |
| 4 | 0.008141 | 0.238377 | 2082.46453 | 71.119096 |
| 5 | 0.002807 | 0.060188 | 525.80314 | 24.523826 |
| 6 | 0.074658 | 4.043392 | 35322.14143 | 652.211159 |
| 7 | 0.004632 | 0.228392 | 1995.22922 | 40.464313 |
| 8 | 0.074953 | 6.599125 | 57649.95229 | 654.786160 |
| 9 | 0.005067 | 0.270923 | 2366.78743 | 44.265506 |
| 10 | 0.009629 | 0.624321 | 5454.07045 | 84.116724 |
| 13 | 0.000182 | 0.024541 | 214.39207 | 1.594049 |
| 14 | 0.023174 | 1.335496 | 11666.88932 | 202.444186 |
| 15 | 0.002190 | 0.216178 | 1888.53496 | 19.128584 |
| 16 | 0.000042 | 0.004709 | 41.14069 | 0.367857 |
| 18 | 0.005713 | 0.507290 | 4431.68390 | 49.905986 |
| 19 | 0.000674 | 0.046141 | 403.08510 | 5.885718 |
| 20 | 0.000267 | 0.017418 | 152.16562 | 2.329763 |

TABLE 21

Annual Indices of the SPC System

| Power Flow Model | LOLP | EDNS MW | LOEE MWh/yr | LOLE hr/yr |
|---|---|---|---|---|
| LC-ELOPF | 0.001062 | 0.02356 | 205.85842 | 9.27717 |
| ELOPF | 0.000326 | 0.00659 | 57.59663 | 2.84729 |
| DCOPF | 0.000220 | 0.00629 | 54.94157 | 1.92192 |

Tables 21 and 24 show the annual and annualized indices of the SPC system. Tables 25 shows bus annual indices of the SPC system respectively using ELOPF model. Tables 26 shows bus annual indices of the SPC system using LC-ELOPF model. The annualized indices were evaluated at the annual peak load. Annual indices using linearized load flow is very close to the annual indices using DC load flow. However, annualized indices show a significant difference between using linearized load flow and DC load flow. These differences in the results can be attributed to the voltage and reactive power limits violations. For instance, in some loading scenarios, comparatively large reactive powers were flowing in some lines which cause under voltage violations. Contributions of under voltages violations in the annualized indices of the SPC system are given in Table 27.

In comparison between the annualized indices of the IEEE RTS and the SPC systems, the probability of availability of the generating units in IEEE RTS is higher than that of the SPC. Therefore, encountering states with generation less than the peak load in the SPC system is more likely than that of the IEEE RTS. From the analyses of the reactive power flowing in the transmission lines, most of the time the reactive power flowing in the lines of the SPC is larger than that of the IEEE RTS which cause under voltage violations.

TABLE 22

Bus Annual Indices of the SPC System Using ELOPF Model

| Bus No. | LOLP | EDNS MW | LOEE MWh/yr | LOLE hr/yr |
|---|---|---|---|---|
| 4 | 0.000044 | 0.000730 | 6.377676 | 0.388267 |
| 15 | 0.000126 | 0.004486 | 39.19071 | 1.100089 |
| 20 | 0.000111 | 0.000679 | 5.931926 | 0.970667 |
| 21 | 0.000037 | 0.000062 | 0.540998 | 0.323556 |
| 22 | 0.000044 | 0.000636 | 5.555318 | 0.388267 |

TABLE 23

Bus Annual Indices of the SPC System Using LC-ELOPF Model

| Bus No. | LOLP | EDNS MW | LOEE MWh/yr | LOLE hr/yr |
|---|---|---|---|---|
| 5 | 0.000089 | 0.000350 | 3.053730 | 0.773097 |
| 13 | 0.000089 | 0.002110 | 18.43079 | 0.773097 |
| 15 | 0.000265 | 0.012047 | 105.2415 | 2.319292 |
| 20 | 0.000708 | 0.009058 | 79.13238 | 6.184779 |

TABLE 24

Annualized Indices of the SPC System

| Power Flow Model | LOLP | EDNS MW | LOEE MWh/yr | LOLE hr/yr |
|---|---|---|---|---|
| LC-ELOPF | 0.03110 | 1.11890 | 9774.6915 | 271.66641 |
| ELOPF | 0.01473 | 0.26794 | 2340.7418 | 128.6638 |
| DCOPF | 0.00108 | 0.03795 | 331.49548 | 9.31840 |

TABLE 25

Bus Annualized Indices of the SPC System Using ELOPF Model

| Bus No. | LOLP | EDNS MW | LOEE MWh/yr | LOLE hr/yr |
|---|---|---|---|---|
| 3 | 0.000108 | 0.000300 | 2.621588 | 0.943488 |
| 4 | 0.000122 | 0.005478 | 47.859528 | 1.065792 |
| 5 | 0.000182 | 0.002665 | 23.285737 | 1.589952 |

TABLE 25-continued

Bus Annualized Indices of the SPC System Using ELOPF Model

| Bus No. | LOLP | EDNS MW | LOEE MWh/yr | LOLE hr/yr |
|---|---|---|---|---|
| 6 | 0.000228 | 0.009977 | 87.157524 | 1.991808 |
| 8 | 0.000320 | 0.007862 | 68.681732 | 2.795520 |
| 12 | 0.000006 | 0.000026 | 0.228938 | 0.017472 |
| 13 | 0.000134 | 0.001002 | 8.751720 | 1.170624 |
| 15 | 0.000122 | 0.007064 | 61.709357 | 1.065792 |
| 16 | 0.000304 | 0.004084 | 35.678839 | 2.655744 |
| 19 | 0.001442 | 0.001716 | 14.990897 | 12.597312 |
| 20 | 0.013236 | 0.213513 | 1865.250743 | 115.629696 |
| 21 | 0.001366 | 0.008569 | 74.862137 | 11.933376 |
| 22 | 0.000142 | 0.005568 | 48.643146 | 1.240512 |
| 24 | 0.000002 | 0.000028 | 0.246355 | 0.017472 |
| 25 | 0.000004 | 0.000089 | 0.773585 | 0.034944 |

TABLE 26

Bus Annualized Indices of the SPC System Using LC-ELOPF Model

| Bus No. | LOLP | EDNS MW | LOEE MWh/yr | LOLE hr/yr |
|---|---|---|---|---|
| 1 | 0.000009 | 0.000108 | 0.94668 | 0.07731 |
| 3 | 0.000124 | 0.000632 | 5.51992 | 1.08234 |
| 4 | 0.000248 | 0.010389 | 90.75999 | 2.16467 |
| 5 | 0.002124 | 0.053832 | 470.27529 | 18.55434 |
| 6 | 0.014779 | 0.628352 | 5489.27883 | 129.10726 |
| 7 | 0.000027 | 0.000155 | 1.35747 | 0.23193 |
| 8 | 0.016062 | 0.172657 | 1508.33526 | 140.31717 |
| 11 | 0.000035 | 0.000849 | 7.41251 | 0.30924 |
| 12 | 0.000168 | 0.002932 | 25.61244 | 1.46888 |
| 13 | 0.000089 | 0.001429 | 12.48029 | 0.77310 |
| 15 | 0.000221 | 0.010903 | 95.24469 | 1.93274 |
| 16 | 0.000496 | 0.005868 | 51.26466 | 4.32935 |
| 19 | 0.001257 | 0.006655 | 58.14192 | 10.97798 |
| 20 | 0.017912 | 0.203570 | 1778.38763 | 156.47490 |
| 21 | 0.000044 | 0.000254 | 2.21933 | 0.38655 |
| 22 | 0.000699 | 0.006790 | 59.31327 | 6.10747 |
| 23 | 0.000584 | 0.008481 | 74.08695 | 5.10244 |
| 24 | 0.000345 | 0.000834 | 7.28588 | 3.01508 |
| 30 | 0.001027 | 0.004209 | 36.76851 | 8.96793 |

TABLE 27

Contributions of Under Voltages Violations on the Annualized Indices of the SPC System When Using ELOPF

|  | LOLP | EDNS MW | LOLE | LOEE |
|---|---|---|---|---|
| Value | 0.00024 | 0.00461 | 40.2325 | 2.09661 |
| Percentage % | 1.71551 | 7.25071 | 7.25071 | 1.71551 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Abbreviations Used:

| ACPF | ac power flow (using non-linear equations) |
|---|---|
| DCPF | dc power flow |
| ELPF | enhanced linear power flow |
| LC-ELPF | loss-compensated enhanced linear power flow |
| ACOPF | optimal (non-linear) power flow with ac constraints |
| DCOPF | optimal (linear) power flow with dc constraints |
| ELOPF | enhanced linear optimal power flow |
| LC-ELOPF | loss-compensated enhanced linear optimal power flow |
| LP | linear programming |

The invention claimed is:

1. A computer-implemented tool for optimizing and controlling a power grid of a plurality of generation nodes interconnected by a network of transmission lines, comprising:
a processor having associated memory storing executable code with which the processor is programmed to execute a solver algorithm;
the memory being configured to store an optimization function upon which the processor operates in executing the solver algorithm, wherein the optimization function includes linearized approximations of generation costs;
the memory being configured to store a plurality of constraints accessed by the processor in executing the solver algorithm wherein:
a first constraint of the plurality of constraints is stored in a power flow model data structure that includes both real and reactive power terms that correspond to the plurality of generation nodes, wherein the real and reactive power terms of the power flow model data structure are expressed as linear functions of voltage magnitudes and voltage angles related by a matrix having elements derived from data obtained from the power grid; and
a second constraint of the plurality of constraints is stored in a transmission line model data structure that includes both real and reactive power terms represented as piecewise linearized parameters stored in a piecewise linear representation data structure that includes linear constraints of the network of transmission lines; and
the processor being coupled to a control station that communicates with at least one generation node of the plurality of generation nodes, wherein the processor is configured to change a generation output of the at least one generation node of the plurality of generation nodes in accordance with (i) the optimization function and (ii) piecewise linearized approximations of generator capabilities.

2. The tool of claim 1 wherein the solver algorithm is a linear programming algorithm.

3. The tool of claim 1 wherein the memory stores a bus admittance matrix associated with the power grid being optimized, and further stores phase angle and voltage values of the power grid being optimized; and
wherein the real and reactive power terms of the power flow model data structure comprise the matrix product of said bus admittance matrix and said phase angle and voltage.

4. The tool of claim 3 wherein the bus admittance matrix includes both real and reactive admittance values for each of the real and reactive power terms.

5. The tool of claim 1 wherein the real and reactive power terms of the transmission line model data structure are expressed as a set of piecewise linear constraints.

6. The tool of claim 5 wherein the real and reactive power terms of the transmission line model data structure define a circular constraint in a real-reactive locus and wherein each of the set of piecewise linear constraints is tangent to a different point on said circular constraint.

7. The tool of claim 1 wherein the power flow model data structure stores for each node in the power grid a real power loss term representing transmission line loss allocated to that node.

8. The tool of claim 3 wherein the bus admittance matrix stores for each bus in the power grid a real power loss term representing transmission line loss allocated to that bus.

9. The tool of claim 1 wherein the processor includes an interface port through which the optimization function is input for storage in said memory.

10. The tool of claim 9 wherein said interface port is coupled to a display and data input device manipulable by a user to specify the optimization function.

11. The tool of claim 1 wherein the processor includes an interface port through which the plurality of constraints are input for storage in said memory.

12. The tool of claim 11 wherein said interface port is coupled to a data store containing constraint data for a plurality of nodes that make up the power grid being optimized.

13. The tool of claim 12 wherein the data store is coupled to the interface port through a computer network.

14. A computer-implemented method of optimizing a power grid of a plurality of generation nodes interconnected by a network of transmission lines, comprising:
    storing in computer-readable memory first parameters corresponding to an optimization function, wherein the optimization function includes linearized approximations of generation costs;
    storing in computer-readable memory second parameters corresponding to a plurality of constraints defined by the power grid to be optimized, wherein:
        a first constraint of the plurality of constraints is stored in a power flow model data structure that includes both real and reactive power terms that correspond to the plurality of generation nodes, wherein the real and reactive power terms of the power flow model data structure are expressed as linear functions of voltage magnitudes and voltage angles related by a matrix having elements derived from data obtained from the power grid; and
        a second constraint of the plurality of constraints is stored in a transmission line model data structure that includes both real and reactive power terms represented as piecewise linearized parameters stored in a piecewise linear representation data structure that includes linear constraints of the network of transmission lines;
    using a processor to access said computer-readable memory and to execute a solver algorithm to optimize said optimization function within the bounds of the plurality of constraints and thereby generate and store in said memory an optimized power grid result; and
    using said processor to change a generation output of at least one of the generation nodes in accordance with (i) the optimized power grid result and (ii) piecewise linearized approximations of generator capabilities.

15. The method of claim 14 wherein the processor employs a linear programming algorithm to optimize said optimization function.

16. The method of claim 14 further comprising:
    storing a bus admittance matrix associated with the power grid being optimized;
    storing phase angle and voltage values of the power grid being optimized; and
    programming the processor to define the real and reactive power terms of said power flow model data structure as the matrix product of said bus admittance matrix and said phase angle and voltage.

17. The method of claim 16 wherein the bus admittance matrix includes both real and reactive admittance values for each of the real and reactive power terms.

18. The method of claim 14 further comprising expressing the transmission line model data structure as a set of piecewise linear constraints stored in memory.

19. The method of claim 18 wherein the real and reactive power terms of the transmission line model data structure define a circular constraint in a real-reactive locus and wherein each of the set of piecewise linear constraints is tangent to a different point on said circular constraint.

20. The method of claim 14 further comprising: for each node in the power grid, storing as part of the power flow model a real power loss term representing transmission line loss allocated to that node.

21. The method of claim 16 further comprising: for each bus in the power grid, storing as part of the bus admittance matrix a real power loss term representing transmission line loss allocated to that bus.

22. A system for controlling a power grid made up of plural interconnected generation sources serving plural attached loads, comprising:
    a control station configured to communicate with said generation sources and said loads via power controllers attached to the generation sources and loads; and
    computer-implemented linear optimal power flow solver circuitry in communication with the control station, the circuitry including:
        a processor having associated memory storing executable code with which the processor is programmed to execute a solver algorithm;
        the memory being configured to store an optimization function upon which the processor operates in executing the solver algorithm, wherein the optimization function includes linearized approximations of generation costs;
        the memory being configured to store a plurality of constraints accessed by the processor in executing the solver algorithm, wherein:
            a first constraint of the plurality of constraints is stored in a power flow model data structure that includes both real and reactive power terms that correspond to the generation sources, wherein the real and reactive power terms of the power flow model data structure are expressed as linear functions of voltage magnitudes and voltage angles related by a matrix having elements derived from data obtained from the power grid; and
            a second constraint of the plurality of constraints is stored in a transmission line model data structure that includes both real and reactive power terms represented as piecewise linearized parameters stored in a piecewise linear representation data structure that includes linear constraints of a network of transmission lines; and the processor (i) being coupled to the control station and (ii) configured to change a generation output of at least one of said generation sources in accordance with (i) the optimization function and (ii) piecewise linearized approximations of generator capabilities.

23. The system of claim 22 wherein the computer-implemented linear optimal power flow solver circuitry and the control station are in communication with one another via a networked connection.

24. The system of claim 22 wherein the power controllers communicate wirelessly with the control station.

25. The system of claim 22 wherein the memory stores a bus admittance matrix associated with the power grid, and further stores phase angle and voltage values of the power grid; and wherein the real and reactive power terms of the power flow model data structure comprise the matrix product of said bus admittance matrix and said phase angle and voltage.

26. The system of claim 25 wherein the bus admittance matrix includes both real and reactive admittance values for each of the real and reactive power terms.

27. The system of claim 22 wherein the real and reactive power terms of the transmission line model data structure are expressed as a set of piecewise linear constraints.

28. The system of claim 27 wherein the real and reactive power terms of the transmission line model data structure define a circular constraint in a real-reactive locus and wherein each of the set of piecewise linear constraints is tangent to a different point on said circular constraint.

29. The system of claim 22 wherein the power flow model data structure stores for each node in the power grid a real power loss term representing transmission line loss allocated to that node.

30. The system of claim 25 wherein the bus admittance matrix stores for each bus in the power grid a real power loss term representing transmission line loss allocated to that bus.

31. The system of claim 22 wherein the processor includes an interface port through which the optimization function is input for storage in said memory.

32. The system of claim 31 wherein said interface port is coupled to a display and data input device manipulable by a user to specify the optimization function.

33. The system of claim 22 wherein the processor includes an interface port through which the plurality of constraints are input for storage in said memory.

34. The system of claim 33 wherein said interface port is coupled to a data store containing constraint data for a plurality of nodes that make up the power grid.

35. A system comprising:
a plurality of interconnected generation sources;
a plurality of loads;
a plurality of transmission lines configured to connect the plurality of generation sources and the plurality of loads;
a control station configured to communicate with the plurality of generation sources and the plurality of loads via power controllers attached to (i) each generation source of the plurality of generation sources and (ii) each load of the plurality of loads; and
computer-implemented linear optimal power flow solver circuitry in communication with the control station, the circuitry including:
a processor having associated memory storing executable code with which the processor is programmed to execute a solver algorithm, and
the memory being configured to store (i) an optimization function upon which the processor operates in executing the solver algorithm, and (ii) a plurality of constraints accessed by the processor in executing the solver algorithm,
wherein:
the optimization function includes linearized approximations of generation costs,
a first constraint of the plurality of constraints is stored in a power flow model data structure that includes both real and reactive power terms that correspond to the plurality of generation sources, wherein the real and reactive power terms of the power flow model data structure are expressed as linear functions of voltage magnitudes and voltage angles related by a matrix having elements derived from data obtained from a power grid,
a second constraint of the plurality of constraints is stored in a transmission line model data structure that includes both real and reactive power terms represented as piecewise linearized parameters stored in a piecewise linear representation data structure that includes linear constraints of the plurality of transmission lines,
the processor is configured to supply a result of the optimization function to the control station, and
the control station is configured to change a generation output of at least one generation source of the plurality of generation sources based on (i) the result of the optimization function and (ii) piecewise linearized approximations of generator capabilities.

* * * * *